(12) United States Patent
Poggio et al.

(10) Patent No.: US 8,859,645 B2
(45) Date of Patent: Oct. 14, 2014

(54) FLUOROPOLYMER DISPERSION PURIFICATION

(75) Inventors: Tiziana Poggio, Montechiaro d'Acqui (IT); Fabrizio Spada, Bosco Marengo (IT); Valeri Kapeliouchko, Alessandria (IT)

(73) Assignee: Solvay Solexis S.p.A., Milano (IT)

( * ) Notice: Subject to any disclaimer, the term of this patent is extended or adjusted under 35 U.S.C. 154(b) by 0 days.

(21) Appl. No.: 12/296,485

(22) PCT Filed: Apr. 6, 2007

(86) PCT No.: PCT/EP2007/053427
§ 371 (c)(1),
(2), (4) Date: Oct. 8, 2008

(87) PCT Pub. No.: WO2007/116037
PCT Pub. Date: Oct. 18, 2007

(65) Prior Publication Data
US 2009/0272944 A1    Nov. 5, 2009

(30) Foreign Application Priority Data
Apr. 11, 2006    (EP) .................................... 06112473

(51) Int. Cl.
| C08F 6/16 | (2006.01) |
| C08J 3/03 | (2006.01) |
| C08L 27/12 | (2006.01) |
| C08L 71/02 | (2006.01) |

(52) U.S. Cl.
CPC .............. *C08F 6/16* (2013.01); *C08J 2327/12* (2013.01); *C08J 3/03* (2013.01); *C08J 2327/20* (2013.01); *C08J 2327/18* (2013.01); *C08L 27/12* (2013.01); *C08L 71/02* (2013.01)
USPC ........... 523/310; 210/263; 210/683; 210/685; 210/692; 523/332; 524/376; 524/544; 524/546

(58) Field of Classification Search
USPC .......... 524/301, 319, 376, 544, 546; 210/662, 210/683, 685, 690, 692; 523/310
See application file for complete search history.

(56) References Cited

U.S. PATENT DOCUMENTS

| 2,559,752 | A | | 7/1951 | Berry |
| 3,037,953 | A | | 6/1962 | Mitchel et al. |
| 3,301,807 | A | | 1/1967 | Juzaemon |
| 3,682,975 | A | * | 8/1972 | Tesoro ........................... 549/215 |
| 3,704,272 | A | | 11/1972 | Holmes |
| 4,016,345 | A | | 4/1977 | Holmes |
| 4,369,266 | A | | 1/1983 | Kuhls et al. |
| 4,725,644 | A | | 2/1988 | Malhotra |
| 5,118,787 | A | | 6/1992 | Furuno |
| 5,763,552 | A | | 6/1998 | Feiring et al. |
| 6,136,893 | A | | 10/2000 | Yamashita et al. |
| 6,720,360 | B1 | | 4/2004 | Grootaert et al. |
| 6,825,250 | B2 | | 11/2004 | Epsch et al. |
| 6,833,403 | B1 | | 12/2004 | Blaedel et al. |
| 6,861,466 | B2 | | 3/2005 | Dadalas et al. |
| 6,956,078 | B2 | * | 10/2005 | Cavanaugh et al. ........... 524/378 |
| 7,041,728 | B2 | | 5/2006 | Zipplies et al. |
| 7,101,925 | B2 | | 9/2006 | Malvasi et al. |
| 7,294,276 | B2 | | 11/2007 | Malvasi et al. |
| 7,294,668 | B2 | | 11/2007 | Zipplies et al. |
| 7,297,744 | B2 | | 11/2007 | Kapeliouchko et al. |
| 7,468,403 | B2 | * | 12/2008 | Nakatani et al. ............... 523/310 |
| 7,534,825 | B2 | | 5/2009 | Malvasi et al. |
| 7,678,848 | B2 | * | 3/2010 | Malvasi et al. ................ 523/310 |
| 2003/0125421 | A1 | | 7/2003 | Bladel et al. |
| 2004/0186216 | A1 | | 9/2004 | Satoh et al. |
| 2005/0154104 | A1 | * | 7/2005 | Malvasi et al. ................ 524/379 |
| 2005/0189299 | A1 | | 9/2005 | Malvasi et al. |
| 2006/0014886 | A1 | * | 1/2006 | Hintzer et al. ................. 524/544 |
| 2006/0041051 | A1 | * | 2/2006 | Nakatani et al. ............... 524/544 |
| 2006/0148973 | A1 | | 7/2006 | Malvasi et al. |
| 2006/0175261 | A1 | * | 8/2006 | Noelke et al. .................. 210/662 |
| 2006/0247366 | A1 | | 11/2006 | Mirigliani et al. |
| 2007/0015864 | A1 | | 1/2007 | Hintzer et al. |
| 2007/0015865 | A1 | | 1/2007 | Hintzer et al. |

(Continued)

FOREIGN PATENT DOCUMENTS

| DE | 1131013 | 6/1962 |
| EP | 0822175 A2 | 2/1998 |

(Continued)

OTHER PUBLICATIONS

Derwent Abstract of Ogura et al., JP 08-020611 A, 1998.*

(Continued)

*Primary Examiner* — Nicole M Buie-Hatcher
(74) *Attorney, Agent, or Firm* — Arent Fox LLP

(57) ABSTRACT

The invention pertain to a process for purifying a fluoropolymer dispersion, said process comprising:

Figure 1:
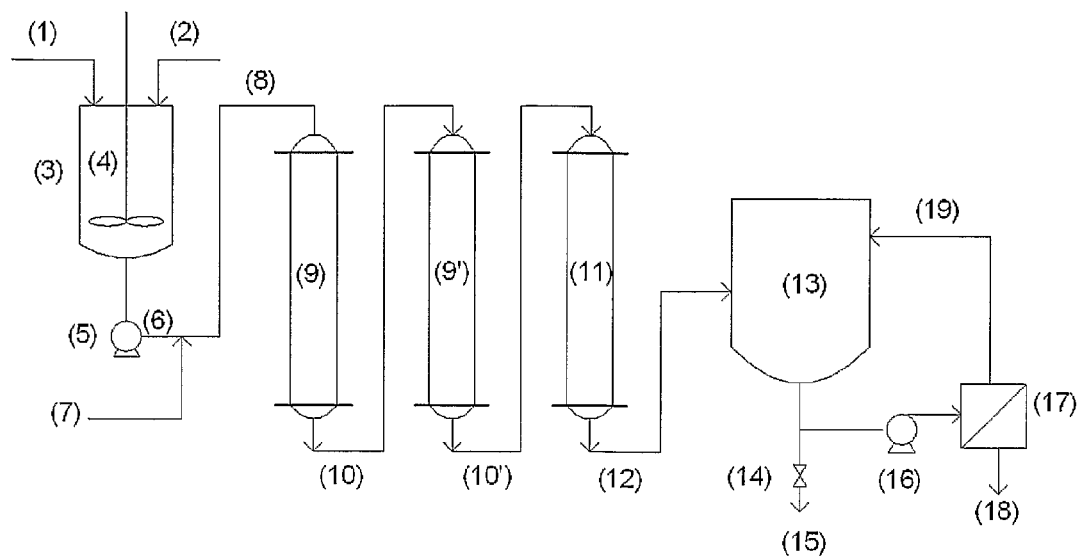

(i) providing an aqueous dispersion (D) of at least one fluoropolymer [polymer (F)]comprising at least one fluorinated surfactant [surfactant (FS)], having a solids content (SC) of 15% by weight or more;

(ii) adding to said aqueous dispersion (D) at least one non-ionic non-fluorinated surfactant [surfactant (NS)];

(iii) adjusting said solid content (SC) to less than 10% by weight, to obtain a diluted aqueous dispersion (dD);

(iv) contacting said diluted aqueous dispersion (dD) with at least one adsorbing material, so as to obtain an aqueous dispersion of polymer (F) having a content of the fluorinated surfactant (FS) of less than 1 ppm based on the total weight of solids.

Still an object of the invention is an aqueous fluoropolymer dispersion comprising less than 1 ppm of fluorinated surfactant.

8 Claims, 1 Drawing Sheet

(56) References Cited

U.S. PATENT DOCUMENTS

| | | |
|---|---|---|
| 2007/0015866 A1 | 1/2007 | Hintzer et al. |
| 2007/0015937 A1 | 1/2007 | Hintzer et al. |
| 2007/0021551 A1 | 1/2007 | Malvasi et al. |
| 2007/0025902 A1 | 2/2007 | Hintzer et al. |
| 2007/0027251 A1 | 2/2007 | Hintzer et al. |

FOREIGN PATENT DOCUMENTS

| | | |
|---|---|---|
| EP | 1174448 A1 | 1/2002 |
| EP | 1489104 A1 | 12/2004 |
| EP | 1533325 A1 | 5/2005 |
| EP | 1538177 A1 | 6/2005 |
| EP | 1574527 A1 | 9/2005 |
| EP | 1584632 A1 | 10/2005 |
| EP | 1645572 A1 | 4/2006 |
| JP | 08020611 A * | 1/1996 |
| JP | 2005008775 A | 1/2005 |
| WO | WO9708214 A1 | 3/1997 |
| WO | WO 2004050719 A1 * | 6/2004 |
| WO | WO2005003190 A1 | 1/2005 |

OTHER PUBLICATIONS

Ajroldi G. et al. "Some Rheological Properties of molten Polytetrafluoroethylene", Journal Applied Polymer Science, (1970), vol. 14, pp. 79-88, John Wiley & Sons, Inc. (10 pg.).

Chu B. "Laser light scattering" Academic Press: New York, 1974 (book review solely provided ; 2 pg.).

"Nonionic Surfactants", Edited by Schick, M.J., (1967) pp. 76-85 and 103-141, Marcel Dekker, Inc., New York (50 pg.).

PCT International Search Report dated Aug. 10, 2007 for International Application No. PCT/EP2007/53427 (3 pg.).

* cited by examiner

FLUOROPOLYMER DISPERSION PURIFICATION

CROSS-REFERENCE TO RELATED APPLICATIONS

This application is a U.S. national stage application under 35 U.S.C. §371 of International Application No. PCT/EP2007/053427, filed Apr. 6, 2007, which claims priority to European Application No. 06112473.1, filed Apr. 11, 2006, all of these applications being herein incorporated by reference in their entirety for all purposes.

TECHNICAL FIELD

The invention relates to an improved process for the purification of aqueous dispersions of fluoropolymers and to aqueous fluoropolymer dispersions.

BACKGROUND ART

Polyfluoroethylene dispersions find wide application in the coating industry due to the unique performance of the coatings in respect of e.g. release properties, good weathering resistance, and flame retardancy. They are mainly used for coating kitchenware, chemical apparatus and glass fabrics. In many such applications, the dispersions are applied at relatively high solids contents, e.g., up to 70-75% by weight. These concentrated dispersions are mainly stabilized by non-ionic emulsifiers such as alkylarylpolyethoxy alcohols and alkylpolyethoxy alcohols, using colloid-chemistry methods.

There are in principle two different polymerization processes for preparing fluoropolymers, namely suspension polymerization leading to polymer granules and, on the other hand the process known as emulsion polymerization (also called dispersion polymerization), leading to an aqueous colloidal dispersion. This invention concerns a purification process which can be notably applied to dispersions obtained from emulsion polymerization.

The manufacture of such fluoropolymer dispersions, especially tetrafluoroethylene (TFE) polymers (homopolymers and copolymers) comprises, generally, an emulsion polymerisation step.

In all of these emulsion polymerizations, a surfactant or emulsifier is required to stabilize fluoropolymer dispersion in aqueous medium; said surfactant is generally chosen as not to disrupt the polymerization by chain transfer. These surfactant are termed nontelogenic emulsifiers (U.S. Pat. No. 2,559, 752). Use is mainly made of perfluorooctanoic acid (PFOA) in the form of ammonium and/or alkali metal salts, particularly preferred is anmoniun perfluorooctanoate (APFOA). The content of this surfactant is generally within the range from 0.02 to 1% by weight, based on the fluoropolymer.

Also, other fluorinated surfactants can be used. For example,
Patent Citation 0001: EP 822175 A (DU PONT DE NEMOURS). 1998 Feb. 4,
describes the use of salts of $CH_2$-containing fluorocarboxylic acids for the emulsion polymerization of TFE.
Patent Citation 0002: WO WO 97/08214 (DU PONT DE NEMOURS). 1997 Mar. 6
describes the use of 2-perfluorohexylethanesulfonic acid or salts thereof for TFE polymerization.
Other (per)fluorooxyalkylenic surfactants useful for fluoropolymers emulsion polymerization have been described in following patent applications:
Patent Citation 0003: US 2007015864,
Patent Citation 0004: US 2007015865,
Patent Citation 0005: US 2007015866,
Patent Citation 0006: US 2006015937,
Patent Citation 0007: US 2007025902,
Patent Citation 0008: US 2007027251.
Patent Citation 0009: U.S. Pat. No. 2,559,752 (DU PONT DE NEMOURS). 1951 Jul. 10,
describes other fluorinated surfactants, but these have not been widely used since their volatility is low. These chemicals can cause discoloration of the final products at high processing temperatures.

While fluoropolymer aqueous emulsions obtained from polymerization generally have a solids content of about 15 to 40% by weight, industrial utilization thereof requires said dispersions to be concentrated up to about 40 to 75% by weight. A first example of concentration processes is notably a decantation or phase-separation process (also known as clouding process) as described for instance in
Patent Citation 0010: U.S. Pat. No. 3,037,953 B (DU PONT DE NEMOURS). 1962 Jun. 5,
Patent Citation 0011: U.S. Pat. No. 3,704,272 B (DU PONT DE NEMOURS). 1972 Nov. 28,
Patent Citation 0012: U.S. Pat. No. 3,301,807 B (THIOKOL CHEMICAL CORP). 1967 Jan. 31, whose disclosures are incorporated herein by reference, said phase-separation process generally comprising adding a non-ionic surfactant to an aqueous fluoropolymer emulsion and heating the mixture to a temperature non lower that the cloud point of the non-ionic surfactant to thereby cause separation into an aqueous phase and a fluoropolymer phase. Another example of concentration process is an ultrafiltration process or dialysis process as described for instance in
Patent Citation 0013: U.S. Pat. No. 4,369,266 B (HOECHST AG). 1983 Jan. 18,
Patent Citation 0014: U.S. Pat. No. 6,136,893 B (DAIKIN IND LTD). 2000 Oct. 24.
whose disclosures are incorporated herein by reference.

Nevertheless, in the techniques listed above for raising concentration, the majority of the fluorinated surfactants remain in the fluoropolymer dispersions.

Thus, during subsequent use of these dispersions, workers can be exposed to contact with the fluorinated surfactants, in particular the PFOA.

It is also known that in the applications of fluoropolymer dispersions, e.g. as coating or in the impregnation of glass fibres, said fluorinated surfactants can reach the environment. Fluorinated surfactants can be released in the environment notably in the washing effluent or can be released in the atmosphere during drying or sintering steps which the fluoropolymer is submitted to during processing. The latter emission is still more pronounced when coatings are produced comprising PFOA (or derivatives thereof) as emulsifier, since PFOA is highly volatile.

However, some of said fluorinated surfactants have been recently classified as hazardous to the environment; their long residence time in living animals (e.g. in human beings) has been demonstrated. Perfluorooctanoic acid (PFOA) and corresponding derivatives have been particularly investigated as contaminant; a US Environmental Protect Agency (EPA) Science Advisory Board has announced on June 2005 a preliminary finding that PFOA is a likely carcinogen; toxicological studies to finally assess effects of this contaminant on animals and human beings are still under progress.

On Jan. 25, 2006, EPA invited fluoropolymer and telomer manufacturers to participate in a global stewardship program on PFOA and related chemicals, and particularly to commit to achieve, no later than 2010, a 95% reduction, measured from a year 2000 baseline, in both facility emissions to all media of PFOA, precursor chemicals that can break down to PFOA, and related higher homologue chemicals, and product content levels of PFOA, precursor chemicals that can break down to PFOA, and related higher homologue chemicals and to commit to working toward the elimination of PFOA, PFOA precursors, and related higher homologue chemicals from emissions and products by five years thereafter, i.e. no later than 2015.

There is thus a strong environmental pressure for substantially reducing PFOA emission, and thus to develop suitable PFOA recovery processes enabling achieving these goals.

In addition, surfactants such as fluorocarboxylic acid and their salts (such as e.g. $CH_2$-containing fluorocarboxylic acids described in, Patent Citation 0015: EP 822175 A (DU PONT DE NEMOURS). 1998 Feb. 4) generally decompose by decarboxylation at the sintering temperatures normally employed, from 350 to 450° C., to give carbon dioxide and fluorinated hydrocarbons, which have a major global-warming effect ("greenhouse effect").

There is thus a strong demand from transformers and final users of fluoropolymer dispersions for producers to provide for said fluoropolymer dispersions substantially free from fluorinated surfactants, in particular from perfluorooctanoic acid and derivatives thereof.

Several solutions have been proposed in the past for the purification of fluoropolymer dispersions from fluorinated surfactants, including phase separation and ion exchange treatments.

Thus,

Patent Citation 0016: EP 1489104 A (ASAHI GLASS CO LTD). 2004 Dec. 22, discloses a process for producing an aqueous polytetrafluoroethylene (PTFE) composition purified from anionic perfluorocarboxylate surfactants (APFC), said process comprising adding a nonionic surfactant and water to an aqueous PTFE emulsion, concentrating the resulting PTFE aqueous dispersion by phase separation and sedimentation and separating the highly concentrated aqueous PTFE dispersion containing a small amount of the APFC from the supernatant containing a large amount of said APFC.

Patent Citation 0017: EP 1574527 A (DAIKIN IND LTD). 2005 Sep. 14, discloses a method of purifying an aqueous fluoropolymer emulsion containing 15-35% by mass of fluoropolymer from fluorine-containing surfactants without lowering its dispersibility, said method comprising purifying an aqueous fluoropolymer emulsion by a specific technique of concentration comprising concentration by phase separation, electric concentration and/or ion exchange concentration.

Patent Citation 0018: WO WO 2005/003190 A (DAIKIN IND LTD). 2005 Jan. 13, discloses a method for removing a fluorine-containing surfactant from a material to be treated, characterized in that it comprises contacting said material with a substance [A] which is a gas under standard conditions, such as supercritical carbon dioxide, to thereby remove the fluorine-containing surfactant.

Purification methods including an ion exchange treatment are generally preferred because of their lower fluorinated surfactant final concentrations in the dispersions.

Patent Citation 0019: U.S. Pat. No. 6,833,403 B (3M INNOVATIVE PROPERTIES). 2004 Dec. 21.

discloses a process for removing fluorine-containing emulsifiers from fluoropolymer dispersions, Said process comprising adding a non-ionic emulsifier to the fluoropolymer dispersion and contacting said stabilized dispersion with a basic anion exchanger. Removal of fluorinated surfactants is carried out either with crude dispersions from polymerization having a solids content of 15 to 30% by weight or with previously concentrated dispersions with a solids content of up to 70% weight.

Patent Citation 0020: U.S. Pat. No. 6,720,360 B (3M INNOVATIVE PROPERTIES). 2004 Apr. 13.

discloses a process for preparing salt-free fluoropolymers, so-called ultra-clean fluoropolymers, said process comprising, inter alia, submitting fluoropolymer lattices to an ion exchange step, wherein both cation and anion exchangers treatments are carried out on raw dispersions from polymerization having a solids content from 10 to 40% by weight, said dispersions being combined with a non-ionic emulsifier to decrease solids content to less than about 20% wt.

Patent Citation 0021: U.S. Pat. No. 6,825,250 B (3M INNOVATIVE PROPERTIES). 2004 Nov. 30.

discloses a process for reducing the amount of fluorinated emulsifier in an aqueous fluoropolymer dispersion by contacting said aqueous fluoropolymer dispersion comprising between 10 and 70% wt of fluoropolymer with an anion exchange resin by agitating the aqueous fluoropolymer dispersion with an effective amount of anion exchange resin and separating the anion exchange resin from the aqueous fluoropolymer dispersion.

Patent Citation 0022: EP 1533325 A (3M INNOVATIVE PROPERTIES). 2005 May 25.

discloses a method of making an aqueous dispersion of non-melt processible polytetrafluoroethylene having low amount of fluorinated surfactant, the method comprising, inter alia, emulsion polymerizing tetrafluoroethylene (TFE) in the presence of free radicals capable of introducing ionic end groups or precursors thereof in the PTFE polymer to yield a dispersion having a solids content between 10 and 35% wt, and reducing the amount of fluorinated surfactant in the thus obtained aqueous dispersion, e.g. by contacting the dispersion with an anion exchanger.

Patent Citation 0023: EP 1584632 A (SOLVAY SOLEXIS S.P.A). 2005 Oct. 12.

discloses a process to substantially remove the fluorinated anionic surfactants from a fluoropolymer dispersion having a solids content from 20 to 75% weight, said process comprising, inter alia, adding a salt, soluble in water and not giving precipitates in the dispersion under the use conditions and contacting the dispersion with a basic anionic exchanger.

Nevertheless, the ion exchange treatments of the processes of the prior art still suffer from several drawbacks; the efficiency of fluorinated surfactant removal is limited due to the strong affinity of said fluorinated surfactant for the fluoropolymer particles. Moreover, the risk of clogging or jamming the ion exchange resins cannot be avoided and undesired plant shut downs occur due to these phenomena. Also, a considerable amount of mechanical energy is required for circulating the aqueous dispersion through the ion exchange beds: high shear conditions can thus occur, yielding uncontrolled and undesired coagulation phenomena. Finally, agglomerates formation cannot be avoided during said ion exchange treatment: thus, purified dispersion can comprise agglomerates which might generate, if not removed with yield loss and energy consumption, undesirable defects in final parts (films, coating).

DISCLOSURE OF INVENTION

The invention is concerned with a process for purifying a fluoropolymer dispersion, said process comprising:

(i) providing an aqueous dispersion (D) of at least one fluoropolymer [polymer (F)] comprising at least one fluorinated surfactant [surfactant (FS)], having a solids content (SC) of 15% by weight or more;
(ii) adding to said aqueous dispersion (D) at least one non-ionic non-fluorinated Surfactant [surfactant (NS)];
(iii) adjusting said solid content (SC) to less than 10% by weight, to obtain a diluted aqueous dispersion (dD);
(iv) contacting said diluted aqueous dispersion (dD) with at least one adsorbing material, so as to obtain an aqueous dispersion of polymer (F) having a content of the fluorinated surfactant (FS) of less than 1 ppm based on the total weight of solids.

The process of the invention provides for an aqueous dispersion of polymer (F) comprising advantageously 0.8 ppm or less, preferably 0.75 ppm or less, more preferably 0.5 ppm or less of fluorinated surfactant (FS), based on the total weight of solids.

It is to be outlined that even a reduction of fractions of ppm's of the fluorinated surfactant content of the aqueous dispersion of polymer (F) is indeed of great value due to the extreme environmental pressure and will be highly appreciated in the market. As an example, a fluoropolymer dispersion accessible via the process of then invention can have a residual PFOA content as low as 0,1 ppm: such dispersion will emits in environment 250 times less of PFOA with respect to dispersion having 2,5 ppm content.

By carrying out the adsorbing material treatment on a diluted dispersion, i.e. on a dispersion having a solids content of less than 10% weight, the removal of the fluorinated surfactant advantageously takes place with improved efficiency. The Applicant has found, without this limiting the scope of the invention, that when aqueous dispersion is diluted prior to step (iv), a larger amount of the fluorinated surfactant (FS) is made available for the adsorption process. It is generally understood that the fluorinated surfactant (FS) present in the aqueous dispersion (D) is shared into two fractions, a first fraction being adsorbed on surface of polymer (F) particles, a second fraction being solubilized in water, equilibrium between these two fraction being dependent, inter alia, upon solids content (SC). It is also generally understood that the former fraction of fluorinated surfactant (FS) solubilized in water has greater affinity for the adsorbing materials, in particular for the ion-exchange sites of the ion-exchange resins, than the latter fraction. Thus by diluting the aqueous dispersion (D), a larger amount of fluorinated surfactant (FS) is advantageously made available in solution and thus efficiency of the adsorption process, in particular of the ion-exchange process, is increased, enabling achievement of lower fluorinated surfactant concentration in final purified dispersion.

Moreover, by diluting the aqueous dispersion prior to the adsorbing material treatment, the risk of jamming or clogging adsorbing material, in particular the ion exchange resins, especially when used in a bed-like layout, by coagulated fluoropolymer particles, can be reduced.

Also, by diluting the aqueous dispersion prior to the adsorbing material treatment, dispersion stability can be increased, that is to say that the risk of forming agglomerates, due to uncontrolled coagulation phenomena, can be reduced. The presence of these agglomerates is generally considered as highly undesirable, as agglomerates of coagulated particles can yield defects (like cracks or holes) when the dispersion is finally applied for coating.

Finally, the viscosity of the diluted dispersion can be reduced, so that it is possible to circulate said dispersion in the process with minor pressure losses. It is generally understood that the viscosity of a liquid comprising solid particles depends, inter alia, upon the concentration of said solid particles and upon the thickness of the double electric layer around the particles, or, in other words, upon the "ionic" diameter of said particles. When ions are present in solution, the thickness of this layer is typically limited, while when ions concentration is highly reduced (as it happens following an ion-exchange process), particle ionic diameter generally strongly increases: viscosity of the liquid can thus achieve high values, which makes handling and circulating said liquid high energy consuming. When working at low solids concentration, thus, even if the ionic diameter of particle increases, the viscosity of the liquid generally remains within acceptable values. This can be particularly helpful when circulating said dispersion through an adsorbing material bed, especially an ion-exchange resin bed, wherein a reduction in upfront diluted dispersion pressure generally reduces the mechanical stress on the adsorbing material and ensure prolonged lifetimes.

As used herein, the term "polymer" encompasses oligomers and polymers, having molecular weight from $10^2$ to $10^8$; also the term encompasses homopolymers and copolymers, depending upon the number of monomers which are employed.

The term "at least one fluoropolymer [polymers (F)]" is understood to mean that the aqueous dispersion may comprise one or more than one polymer (F).

Preferably, the aqueous dispersion (D) comprises only one polymer (F).

In the rest of the text, the expressions "fluoropolymer (F)" and "polymer (F)" are understood, for the purposes of the present invention, both in the plural and the singular.

For the purpose of the present invention, the expressions "fluoropolymer" and "polymer (F)" are intended to denote any polymer comprising recurring units (R), more than 25% wt of said recurring units (R) being derived from at least one ethylenically unsaturated monomer comprising at least one fluorine atom (hereinafter, fluorinated monomer).

The fluoropolymer comprises preferably more than 30% wt, more preferably more than 40% wt of recurring units derived from the fluorinated monomer.

The fluorinated monomer can further comprise one or more other halogen atoms (Cl, Br, I). Shall the fluorinated monomer be free of hydrogen atom, it is designated as per (halo)fluoromonomer. Shall the fluorinated monomer comprise at least one hydrogen atom, it is designated as hydrogen-containing fluorinated monomer.

Non limitative examples of fluorinated monomers are notably tetrafluoroethylene (TFE), vinylidene fluoride (VdF), chlorotrifluoroethylene (CTFE), and mixtures thereof.

Optionally, the fluoropolymer may comprise recurring units derived from one first monomer, said monomer being a fluorinated monomer as above described, and at least one other monomer [comonomer (CM), hereinafter].

Hereinafter, the term comonomer (CM) should be intended to encompass both one comonomer and two or more comonomers.

The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:

$C_3$-$C_8$ fluoro- and/or perfluoroolefins, such as hexafluoropropene, pentafluoropropylene, and hexafluoroisobutylene;

$C_2$-$C_8$ hydrogenated monofluoroolefins, such as vinyl fluoride;

1,2-difluoroethylene, vinylidene fluoride and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

fluoroalkylvinylethers complying with formula $-CF_2=CFOR_{f1}$ in which $R_{f1}$ is a $C_1$-$C_6$ fluoro- or perfluoroalkyl, e.g. $-CF_3$, $-C_2F_5$, $-C_3F_7$;

fluoro-oxyalkylvinylethers complying with formula $CF_2=CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;

fluoroalkyl-methoxy-vinylethers complying with formula $CF_2=CFOCF_2OR_{f2}$ in which $R_{f2}$ is a $C_1$-$C_6$ fluoro- or perfluoroalkyl, e.g. $-CF_3$, $-C_2F_5$, $-C_3F_7$ or a $C_1$-$C_6$ (per)fluorooxyalkyl having one or more ether groups, like $-C_2F_5-O-CF_3$;

fluorodioxoles, of formula:

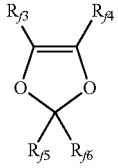

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. $-CF_3$, $-C_2F_5$, $-C_3F_7$, $-OCF_3$, $-OCF_2CF_2OCF_3$.

In a first embodiment of the invention, the polymer (F) is a hydrogen-containing fluoropolymer.

By "hydrogen-containing fluoropolymer" it is meant a fluoropolymer as above defined comprising recurring units derived from at least one hydrogen-containing monomer. Said hydrogen-containing monomer may be the same monomer as the fluorinated monomer or can be a different monomer.

Thus, this definition encompasses notably copolymers of one or more per(halo)fluoromonomer (for instance tetrafluoroethylene, chlorotrifluoroethylene, hexafluoropropylene, perfluoroalkylvinylethers, etc.) with one or more hydrogenated comonomer(s) (for instance ethylene, propylene, vinylethers, acrylic monomers, etc.), and/or homopolymers of hydrogen-containing fluorinated monomers (for instance vinylidene fluoride, trifluoroethylene, vinyl fluoride, etc.) and their copolymers with fluorinated and/or hydrogenated comonomers.

The hydrogen-containing fluoropolymer are preferably chosen among:

(F-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. Nos. 3,624,250 and 4,513,129);

(F-2) Vinylidene fluoride (VdF) polymers, optionally comprising reduced amounts, generally comprised between 0.1 and 15% by moles, of one or more fluorinated comonomer(s) (see for instance U.S. Pat. Nos. 4,524,194 and 4,739,024), and optionally further comprising one or more hydrogenated comonomer(s); and and mixtures thereof.

According to a second preferred embodiment of the invention; the polymer (F) is a per(halo)fluoropolymer.

For the purpose of the invention, the term "per(halo)fluoropolymer" is intended to denote a fluoropolymer substantially free of hydrogen atoms.

The term "substantially free of hydrogen atom" is understood to mean that the per(halo)fluoropolymer consists essentially of recurring units derived from ethylenically unsaturated monomers comprising at least one fluorine atom and free of hydrogen atoms [per(halo)fluoromonomer) (PFM)].

The per(halo)fluoropolymer can comprise recurring units comprising one or more other halogen atoms (Cl, Br, I).

The per(halo)fluoropolymer can be a homopolymer of a per(halo)fluoromonomer (PFM) or a copolymer comprising recurring units derived from more than one per(halo)fluoromonomer (PFM) being chosen among:

$C_2$-$C_8$ perfluoroolefins, such as tetrafluoroethylene (TFE) and hexafluoropropene (HFP);

chloro- and/or bromo- and/or iodo-$C_2$-$C_6$ per(halo)fluoroolefins, like chlorotrifluoroethylene;

per(halo)fluoroalkylvinylethers complying with general formula $CF_2=CFOR_{f3}$ in which $R_{f3}$ is a $C_1$-$C_6$ per(halo)fluoroalkyl, such as $-CF_3$, $-C_2F_5$, $-C_3F_7$;

per(halo)fluoro-oxyalkylvinylethers complying with general formula $CF_2=CFOX_{01}$, in which $X_{01}$ is a $C_1$-$C_{12}$ per(halo)fluorooxyalkyl having one or more ether groups, like perfluoro-2-propoxy-propyl group;

per(halo)fluoro-methoxy-alkylvinylethers complying with general formula $CF_2=CFOCF_2OR_{f4}$ in which $R_{f4}$ is a $C_1$-$C_6$ per(halo)fluoroalkyl, such as $-CF_3$, $-C_2F_5$, $-C_3F_7$ or a $C_1$-$C_6$ per(halo)fluorooxyalkyl having one or more ether groups, such as $-C_2F_5-O-CF_3$;

per(halo)fluorodioxoles of formula:

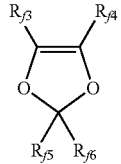

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. $-CF_3$, $-C_2F_5$, $-C_3F_7$, $-OCF_3$, $-OCF_2CF_2OCF_3$; preferably a per(halo)fluorodioxole complying with formula here above, wherein $R_{f3}$ and $R_{f4}$ are fluorine atoms and $R_{f5}$ and $R_{f6}$ are perfluoromethyl groups ($-CF_3$) [perfluoro-2,2-dimethyl-1,3-dioxole (PDD)], or a per(halo)fluorodioxole complying with formula here above, wherein $R_{f3}$, $R_{f5}$ and $R_{f6}$ are fluorine atoms and $R_{f4}$ is a perfluoromethoxy group ($-OCF_3$) [2,2,4-trifluoro-5-trifluoromethoxy-1,3-dioxole or perfluoromethoxydioxole (MDO)].

Preferably the per(halo)fluoropolymer is non melt-processable.

For the purposes of the present invention, by the term "non melt-processable" is meant that the per(halo)fluoropolymer cannot be processed (i.e. fabricated into shaped articles such as films, fibres, tubes, wire coatings and the like) by conventional melt extruding, injecting or casting means. This generally requires that the melt viscosity at the processing temperature be more than $10^7$ poise, preferably in the range from $10^7$ to $10^{13}$ poise, and most preferably from $10^7$ to $10^{12}$ poise.

The melt viscosity of the per(halo)fluoropolymer can be measured according to the method described in Non Patent Citation 0001: AJROLDI, G. Some Rheological Properties of molten Polytetrafluoroethylene. *J. appl. polym. sci.*, 1970 vol. 14, p. 79-88 ISSN 0021-8995. by tensile creep test at 360° C.; this method is particularly suitable for high viscosity compounds (melt viscosity exceeding $10^{10}$).

Otherwise, melt viscosity of the per(halo)fluoropolymer can be measured according to ASTM D-1238-52T, using a cylinder, orifice and piston tip made of a corrosion-resistant alloy, charging a 5.0 g sample to the 9.5 mm inside diameter cylinder which is maintained at a temperature exceeding melting point, extruding the sample 5 minutes after charging through a 2.10 mm diameter, 800 mm long square-edged orifice under a load (piston plus weight) of 5 kg. Melt viscosity is calculated in poise from the observable extrusion rate in grams per minute.

The per(halo)fluoropolymer is advantageously chosen among homopolymers of tetrafluoroethylene (TFE) or copolymers of TFE with at least one per(halo)fluoromonomer (PFM).

Preferred per(halo)fluoropolymer is selected among TFE homopolymer and TFE copolymers comprising recurring units derived from at least one per(halo)fluoromonomer (PFM) chosen among the group consisting of:

perfluoroalkylvinylethers complying with formula $CF_2=CFOR_{f1'}$, in which $R_{f1'}$ is a $C_1$-$C_6$ perfluoroalkyl, e.g. —$CF_3$, —$C_2F_5$, —$C_3F_7$; and/or per(halo)fluorodioxoles of formula:

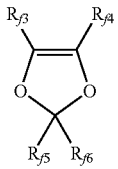

wherein each of $R_{f3}$, $R_{f4}$, $R_{f5}$, $R_{f6}$, equal of different each other, is independently a fluorine atom, a $C_1$-$C_6$ perfluoroalkyl group, optionally comprising one or more oxygen atom, e.g. —$CF_3$, —$C_2F_5$, —$C_3F_7$, —$OCF_3$, —$OCF_2CF_2OCF_3$.

More preferred per(halo)fluoropolymers are selected among TFE homopolymer and TFE copolymers comprising recurring units derived from at least one per(halo)fluoromonomer (PFM) chosen among the group consisting of:

perfluoroalkylvinylethers complying with formula $CF_2=CFOR_{f7'}$, in which $R_{f7'}$ is a group chosen among —$CF_3$, —$C_2F_5$, —$C_3F_7$; and/or per(halo)fluorodioxoles of formula:

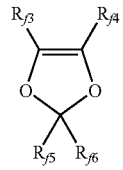

wherein $R_{f3}$ and $R_{f4}$ are fluorine atoms and $R_{f5}$ and $R_{f6}$ are perfluoromethyl groups (—$CF_3$) [perfluoro-2,2-dimethyl-1,3-dioxole (PDD)], or wherein $R_{f3}$, $R_{f5}$ and $R_{f6}$ are fluorine atoms and $R_{f4}$ is a perfluoromethoxy group (—$OCF_3$) [2,2,4-trifluoro-5-trifluoromethoxy-1, 3-dioxole or perfluoromethoxydioxole (MDO)].

The per(halo)fluoromonomer (PFM) is present in the TFE copolymer in an amount of advantageously at least 0.01, preferably at least 0.1% by moles, with respect to the total moles of TFE and per(halo)fluoromonomer (FM).

The per(halo)fluoromonomer (PFM) is present in the TFE copolymer in an amount of advantageously at most 3% by moles, preferably at most 1% by moles, with respect to the total moles of TFE and per(halo)fluoromonomer (PFM).

Good results have been obtained with TFE copolymers comprising from 0.01 to 3% by moles of per(halo)fluoromonomer (PFM).

Good results have been obtained with TFE homopolymer and TFE copolymers wherein the fluorinated comonomer is one or more than one perfluoroalkylvinylether as above specified; particularly good results have been achieved with TFE copolymers wherein the fluorinated comonomer is chosen among perfluoromethylvinylether (of formula $CF_2=CFOCF_3$), perfluoroethylvinylether (of formula $CF_2=CFOC_2F_5$), perfluoropropylvinylether (of formula $CF_2=CFOC_3F_7$) and mixtures thereof.

Best results have been obtained with TFE homopolymer and TFE copolymers wherein the fluorinated comonomer is perfluoromethylvinylether, a mixture of perfluoromethylvinylether and perfluoropropylvinylether, a mixture of perfluoroethylvinylether and perfluoropropylvinylether, or perfluoropropylvinylether.

The aqueous dispersion (D) comprises at least one fluorinated surfactant (FS).

The term "at least one fluorinated surfactant [surfactant (FS)]" is understood to mean that the aqueous dispersion may comprise one or more than one surfactant (FS) (i.e. a mixture of surfactants (FS)).

Preferably, the aqueous dispersion (D) comprises only one surfactant (FS).

In the rest of the text, the expressions "surfactant (FS)" and "fluorinated surfactant" are understood, for the purposes of the present invention, both in the plural and the singular.

The aqueous dispersion (D) advantageously comprises a fluorinated surfactant [surfactant (FS)] of formula:

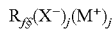

wherein $R_{f8}$ is a $C_5$-$C_{16}$ (per)fluoroalkyl chain or a (per)fluoropolyoxyalkylene chain, $X^-$ is —$COO^-$, —$PO_3^-$ or —$SO_3^-$, $M^+$ is selected from $H^+$, $NH_4^+$, an alkaline metal ion and j can be 1 or 2.

As non limitative example of surfactants (FS), mention may be made of ammonium and/or sodium perfluorocarboxylates, and/or (per)fluoropolyoxyalkylenes having one or more carboxylic end groups.

Other examples of fluorinated surfactants are (per)fluorooxyalkylenic surfactants described in Patent Citation 0024: US 2007015864,
Patent Citation 0025: US 2007015865,
Patent Citation 0026: US 2007015866,
Patent Citation 0027: US 2006015937,
Patent Citation 0028: US 2007025902,
Patent Citation 0029: US 2007027251.

More preferably, the fluorinated surfactant [surfactant (FS)] is chosen from:

$CF_3(CF_2)_{n1}COOM'$, in which $n_1$ is an integer ranging from 4 to 10, preferably from 5 to 7, and more preferably being equal to 6 ; M' represents H, $NH_4$, Na, Li or K, preferably $NH_4$;

$T(C_3F_6O)_{n0}(CFXO)_{m0}CF_2COOM''$, in which T represents Cl or a perfluoroalkoxyde group of formula $C_kF_{2k+1}O$ with k is an integer from 1 to 3, one F atom being optionally substituted by a Cl atom; $n_0$ is an integer ranging from 1 to 6; $m_0$ is an integer ranging from 0 to 6; M'' represents H, $NH_4$, Na, Li or K; X represents F or $CF_3$;

$F-(CF_2-CF_2)_{n2}-CH_2-CH_2-RO_3M'''$, in which R is P or S, preferably S, M''' represents H, $NH_4$, Na, Li or K, preferably H ; $n_2$ is an integer ranging from 2 to 5, preferably $n_2$=3;

A-$R_f$-B bifunctional fluorinated surfactants, in which A and B, equal to or different from each other, are —$(O)_p$ CFX—COOM*; M* represents H, $NH_4$, Na, Li or K, preferably M* represents $NH_4$; X=F or $CF_3$; p is an integer equal to 0 or 1; $R_f$ is a linear or branched perfluoroalkyl chain, or a (per)fluoropolyether chain such that the number average molecular weight of A-$R_f$-B is in the range 300 to 1,800;

and mixtures thereof.

Even more preferably, the fluorinated surfactant [surfactant (FS)] is chosen from those complying with formula $CF_3(CF_2)_{n1}COOM'$, in which $n_1$ is an integer ranging from 4 to 10, preferably from 5 to 7, and more preferably being equal to 6; M' represents H, $NH_4$, Na, Li or K, preferably $NH_4$.

Most preferably, the fluorinated surfactant [surfactant (FS)] is chosen among perfluorooctanoic acid (PFOA) and corresponding alkaline metal or ammonium salts.

By "aqueous dispersion" is meant that the polymer (F) particles are stably dispersed in an aqueous medium (i.e. a liquid medium comprising water, preferably wherein water is the major component, more preferably, consisting essentially of water), so that settling of the particles does not occur within the time when the dispersion will be used.

The particles of polymer (F) are generally anionically stabilized by colloid chemistry methods. The anionic stabilization is typically provided by anionic end groups of the surfactant (FS).

For the purpose of the invention the term "particle" is intended to denote a mass of material that, from a geometrical point of view, has a definite three-dimensional volume and shape, characterized by three dimensions, wherein none of said dimensions exceed the remaining two other dimensions of more than 1000%. Particles are generally not equidimensional, i.e. that are longer in one direction than in others, and include different shapes, such as spheroidal, rod-like, cobblestone, and the like.

The aqueous dispersion (D) is generally obtained directly by the process known as dispersion (or emulsion, including micro-emulsion) polymerization (i.e. as crude polymerization latex).

Otherwise, aqueous dispersions can be prepared by any means known to those skilled in the art. The dispersions are usually prepared by means of size-reduction equipment, such as, for example, a high-pressure homogenizer, a colloid mill, a fast pump, a vibratory agitator or an ultrasound device. The dispersions are preferably prepared by means of a high-pressure homogenizer or colloid mill and in a particularly preferred way by means of a high-pressure homogenizer.

The purification process of the invention is generally carried out with aqueous dispersions from polymerization. The aqueous dispersion (D) of polymer (F) is advantageously obtained by any process comprising an emulsion polymerization step.

Thus, the aqueous dispersion (D) is generally obtained from emulsion polymerization of at least one fluorinated monomer as above described.

During emulsion (including microemulsion) polymerization for obtaining polymer (F), a mild stirring is advantageously applied to prevent the coagulation of the fluoropolymer primary particles.

The polymer (F) polymerization step takes place advantageously in the presence of a fluorinated surfactant (FS) as above described, generally in a sufficiently high amount to stabilize the dispersion of the fluoropolymer (F) primary particles.

The fluorinated surfactant (FS) comprised in the aqueous dispersion (D) is generally the surfactant used for the polymerization.

A co-stabilizer is advantageously used in combination with the surfactant (FS) during the emulsion polymerization. Paraffins with a softening point in the range 48° C.-62° C. are preferred as co-stabilizers.

A detailed description of processes comprising an emulsion polymerization step of fluorinated monomers is available notably in Patent Citation 0030: U.S. Pat. No. 4,016,345 (DU PONT DE NEMOURS). 1977 May 4,
Patent Citation 0031: U.S. Pat. No. 4,725,644 (DUPONT DE NEMOURS). 1988 Feb. 16, and
Patent Citation 0032: EP 11744488 A (AUSIMONT S.P.A). 2002 Jan. 23.

Emulsion polymerization is generally carried out in an aqueous medium comprising water having a reduced content in selected polyvalent cations which are known to yield insoluble salts with the fluorinated surfactant (FS); preferably the aqueous medium of emulsion polymerization comprises water having:

Al content of advantageously 0.25 mg/l or less; preferably 0.10 mg/l or less; more preferably 0.05 mg/l or less;
Ca content of advantageously 0.50 mg/l or less; preferably 0.20 mg/l or less; more preferably 0.10 mg/l or less;
Mg content of advantageously 0.50 mg/l or less; preferably 0.20 mg/l or less; more preferably 0.10 mg/l or less;
Fe content of advantageously 0.25 mg/l or less; preferably 0.10 mg/l or less; more preferably 0.05 mg/l or less.

Determination of said elements content can be notably carried out by inductively coupled plasma optical emission spectrometry according to ISO/DIS 11885 method.

The water-soluble initiator is advantageously chosen from persulphates, permanganates and hydrosoluble organic peroxides, such as disuccinic acid peroxide.

The water-soluble initiator can be optionally used in combination with a reducing agent. An example thereof is $(NH_4)_2Fe(SO_4)_2.6H_2O$ (Mohr's salt).

Aqueous dispersions (D), especially those obtained as crude lattices from emulsion polymerization, have a solid content of 15% wt or more, preferably of 18% wt or more, more preferably of 20% wt or more.

Said aqueous dispersions (D) have a solid content of advantageously at most 40% wt, preferably at most 38% wt, more preferably at most 35% wt.

Generally, in the process of the invention are treated aqueous dispersions (D) having a solids content ranging from 15 to 40% wt, preferably from 20 to 35% wt.

Solids content of the aqueous dispersion (D) can be determined according to standard techniques well-known to those skilled in the art. As an example, solids content of an aqueous dispersion (D) can be determined by weighting a portion (roughly 20 grams) of the aqueous dispersion (D) in an open glass container, putting said filled glass container in an oven for 1 hour at a temperature of 105° C., and weighting the solids residue thereof; solids content is thus determined according to the following equation:

$$\text{Solids content (\%)} = \frac{\text{weight of solid residue at } 105°\text{ C.}}{\text{weight of aqueous dipersion}} \cdot 100 \qquad [\text{Math. 0001}]$$

The polymer (F) particles have an average primary particle size of advantageously less than 500 nm, preferably less than 400 nm, more preferably less than 350 nm and advantageously of more than 1 nm, preferably more than 10 nm, more preferably more than 20 nm.

The average primary particle size of the polymer (F) particles can be measured by photon correlation spectroscopy (PCS) (method also referred to as dynamic laser light scattering (DLLS) technique) according to the method described in Non Patent Citation 0002: CHU, B. *Laser light scattering*. Academic Press: New York, 1974, following ISO 13321 Standard.

It is well-known to the skilled in the art that the PCS gives an estimation of the average hydrodynamic diameter. To the purpose of this invention, the term "average size" is to be intended in its broadest meaning connected with the determination of the hydrodynamic diameter. Therefore, this term will be applied with no limit to the shape or morphology of the polymer (F) cores (cobblestone, rod-like, spherical, and the like).

It should be also understood that, following the purposes of ISO 13321 Standard, the term "average particle size" of primary particles is intended to denote the harmonic intensity-averaged particle diameter $X_{PCS}$, as determined by equation (C10) of annex C of ISO 13321.

As an example, the average primary particle size can be measured by using a Spectra-Physics laser light diffusion instrument equipped with a correlator Brookhaven model 2030AT and an Ar laser source at a wavelength of 514.5 nm and a PCS software (Malvern 1.34 version). Primary average particle size is preferably measured on latex specimens, as obtained from emulsion or microemulsion polymerization, suitably diluted with bidistilled water and filtered at 0.2 μm on Millipore filter.

For the avoidance of doubt, within the context of this invention, the term primary particle is intended to denote particles of polymer (F) which cannot be analyzed in agglomerations of smaller particles; primary particle are generally obtained during polymer (F) manufacture, as latex or dispersion in water. Primary particles of polymer (F) obtained from emulsion or dispersion polymerization can be converted to agglomerates (i.e. collection of primary particles) in the recovery and conditioning steps of polymer (F) manufacture, like notably concentration and/or coagulation of polymer (F) latexes and subsequent drying and homogenization.

According to step (ii) of the process of the invention, at least one non-ionic non-fluorinated surfactant [surfactant (NS)] is added to the aqueous dispersion of polymer (F) particles.

The term "at least one non-ionic non-fluorinated surfactant" and "[surfactant (NS)]" is understood to mean that one or more than one surfactant (NS) is added to the aqueous dispersion.

Non-ionic non-fluorinated surfactants [surfactants (NS)] suitable for the invention are known in the art. Examples of suitable surfactants (NS) can be notably found in
Non Patent Citation 0003: *Nonionic Surfactants*. SCHICK, M. J.: Marcel Dekker, 1967. p. 76-85 and 103-141.

In the rest of the text, the expressions "non-ionic non-fluorinated surfactant" and "surfactant (NS)" are understood, for the purposes of the present invention, both in the plural and the singular.

The Applicant has found, without this limiting the scope of the invention, that the surfactant (NS) is generally not captured by the adsorbing material, in particular by the ion-exchange resins, ad thus can be found in the final purified dispersion, and thus generally enters in the final product formulation.

In view of this, the surfactant (NS) of the invention is chosen preferably among those free from aromatic groups. It is well-known that non-ionic non-fluorinated surfactants comprising aromatic moieties generally convert into harmful organic aromatic compounds (such as benzene, toluene or xylene) on thermal decomposition, during baking of the fluoropolymer. Dispersions free from aromatic moieties containing surfactants are thus appreciated as more environmental friendly products.

The surfactant (NS) is advantageously chosen among fatty alcohol polyethers comprising recurring units derived from ethylene oxide and/or propylene oxide.

The non-ionic non-fluorinated surfactant of the invention advantageously complies with formula (I) here below:

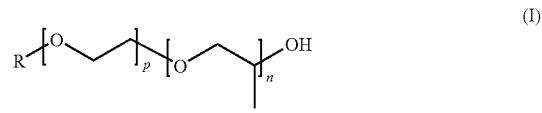

wherein R is a $C_8$-$C_{18}$ alkyl group, p and n, equal or different each other, can be zero or range between 6 and 18, with the provision that at least one of p and n is different from zero. Preferably the group R is chosen among secondary $C_8$-$C_{18}$ alkyl group, tertiary $C_8$-$C_{18}$ alkyl group, or mixture thereof, that is to say among groups complying with (a) and/or (b) here below:

wherein $Ra_1$, $Ra_2$, $Rb_1$, $Rb_2$, $Rb_3$, equal or different at each occurrence, are independently a linear or branched alkyl group comprising at least one carbon atom. Still more preferably, R is a secondary $C_8$-$C_{18}$ alkyl group, that is to say it complies with formula (a) here above.

Preferably, the surfactant (NS) complies with formula (II) here below:

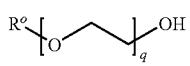
(II)

wherein R° is a $C_9$-$C_{15}$ alkyl group, and q ranges between 7 and 12. Preferably the group R° is chosen among secondary $C_9$-$C_{15}$ alkyl group, tertiary $C_9$-$C_{15}$ alkyl group, or mixture thereof, that is to say from groups chosen among structures (a) and/or (b) here below:

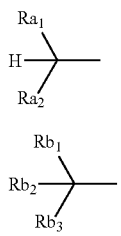

wherein $Ra_1$, $Ra_2$, $Rb_1$, $Rb_2$, $Rb_3$, equal or different at each occurrence, are independently a linear or branched alkyl group comprising at least one carbon atom. Still more preferably, R° is a secondary $C_9$-$C_{15}$ alkyl group, that is to say it complies with formula (a) here above.

Even more preferably, the surfactant (NS) complies with formula (III) here below:

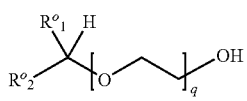
(III)

wherein q has the same meaning as above defined and each of $R°_1$, and $R°_2$, equal or different each other, is independently a $C_2$-$C_{12}$ alkyl group, preferably branched. Surfactants (NS) complying with formula (III) here above are notably derived from secondary fatty alcohols; surfactants of formula (III) comprising a secondary alkyl group are particularly useful for the purpose of the invention as they advantageously confer to the polymer (F) dispersion increased shear stability at a given ethylene oxide content.

Most preferably, the surfactant (NS) complies with formula (IV) here below:

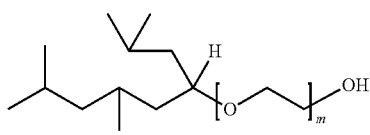

wherein m ranges between 7 and 12. Surfactants (NS) complying with formula (IV) here above are notably derived from 2,6,8-trimethyl-4-nonanol.

Surfactants (NS) have a cloud point, measured according to EN 1890 standard (method A: 1% wt water solution), of advantageously 50° C. or more, preferably of 55° C. or more, even more preferably of 60° C. or more, most preferably of 65° C. or more. When using non-ionic non-fluorinated surfactants having a cloud point of 50° C. or more, it is advantageously possible to carry out the purification process of the invention at a temperature higher than room temperature: it is notably possible to contact the aqueous dispersion and the adsorbing material at a temperature of 30 to 60° C. (temperature at which the kinetics of fluorinated surfactant adsorption on adsorbing material, in particular on ion-exchange resins, is favoured) with no risk of coagulation of the dispersion.

A surfactant (NS) which gave very good results in the process of the invention is the TERGITOL™ TMN-X100 surfactant, commercially available from Dow Chemicals, having a HLB of 14.1, a cloud point of 65° C. and complying with formula (IV) here above, wherein m is equal to about 10.1.

For the avoidance of doubt, HLB is the hydrophilic-lipophilic balance (HLB) which can be determined using the Water-Solubility Method, "The HLB System," ICI Americas, Inc., 1992.

The surfactant (NS) is added in an amount effective to stabilize the aqueous dispersion (D) during the process of the invention.

The actual amount of surfactant (NS) would be easily determined by the skilled in the art upon the nature of the surfactant (NS) employed and the nature and concentration of the aqueous dispersion (D).

Generally, the surfactant (NS) is added in an amount of advantageously from 1 to 20%, preferably 1.5 to 15%, more preferably from 2 to 10% by weight of polymer (F).

Step (ii) is generally carried out under mild stirring, to advantageously achieve homogeneous distribution of the surfactant (NS) through the entire mass of the aqueous dispersion (D).

In this case, the addition of the surfactant (NS) is typically carried out in a stirred vessel; said vessel is generally equipped with means for introducing the aqueous dispersion (D), means for introducing the surfactant (NS), means for withdrawing the resulting mixture and means for stirring.

The stirred vessel has generally a cylindrical form and possesses a round-bottom wherein the withdrawing means are typically located.

According to an embodiment of the invention, an organic solvent (S) is further added to the aqueous dispersion (D) during step (ii) and/or (iii).

The Applicant thinks, without this limiting the scope of the invention, that adding an organic solvent (S) can improve adsorption efficiency favouring extraction of the fluorinated surfactant (FS) from particles surface towards aqueous phase and thus making available said fluorinated surfactant (FS) for the adsorbing material treatment, in particular for the ion exchange process.

The term "organic solvent" encompasses polar organic solvents able to dissolve the fluorinated surfactant (FS) or other organic liquids miscible with water whose solubility parameter $\delta_T$ fall within the range of 5-20.

Non limitative examples of polar organic solvents are N-methylpyrrolidone (NMP); N,N-dimethylformamide (DMF); N,N-dimethylacetamide (DMA); dimethylsulfoxide (DMSO); sulfolane; alcohols, glycols, polyols or corresponding ethers; and combinations thereof.

A discussion of solubility parameters can be found in, for instance, Kirk-Othmer, Encyclopedia of Chemical Technology, second edition (1963), pages 889-895. For the purposes of the present invention, the organic liquids useful in the process of the invention are defined to have the following component parameters of the total solubility parameter $\delta_T$:
dispersion component, $\delta_D$ from 7.0 to 10.0
polar component, $\delta_P$ from 2.0 to 11.0
hydrogen bonding component, $\delta_H$ from 7.0 to 14.0
wherein the equation 1, here below describes the relationship of the various components to the total solubility parameters:
[Math.0002]

$$\delta_T^2 = \delta_D^2 + \delta_P^2 + \delta_H^2 \quad \text{(eq 1)}$$

Preferably the organic solvent is chosen among alcohols, glycols, polyols, corresponding ethers and mixtures thereof.

These solvents are also advantageous as they generally do not substantially affect the properties of the final purified dispersion.

According to step (iii) of the process of the invention, the solids content (SC) of the aqueous dispersion (D) is adjusted to less than 10% by weight, to yield a diluted aqueous dispersion (dD).

Addition of water, of organic solvent (S), of surfactant (NS), or of other suitable fluids, can be used for adjusting solids content of the aqueous dispersion (D) to less than 10% by weight.

To obtain a diluted aqueous dispersion, water is generally added to the aqueous dispersion (D).

In step (iii), water having a reduced content in selected polyvalent cations which are known to yield insoluble salts with the fluorinated surfactant (FS) is generally used; preferably the water has:
Al content of advantageously 0.25 mg/l or less; preferably 0.10 mg/l or less; more preferably 0.05 mg/l or less;
Ca content of advantageously 0.50 mg/l or less; preferably 0.20 mg/l or less; more preferably 0.10 mg/l or less;
Mg content of advantageously 0.50 mg/l or less; preferably 0.20 mg/l or less; more preferably 0.10 mg/l or less;
Fe content of advantageously 0.25 mg/l or less; preferably 0.10 mg/l or less; more preferably 0.05 mg/l or less.

Determination of said elements content can be notably carried out by inductively coupled plasma optical emission spectrometry according to ISO/DIS 11885 method.

Sequence of steps (ii) and (iii) is not critical, that is to say that these steps can be carried out simultaneously or can be carried out sequentially, either step (ii) or step (iii) being carried out first.

It is also understood that part of the water required for achieving a final solids content of less than 10% by weight can be added with the surfactant (NS), for instance as diluent for this surfactant (NS), and the remaining required water can be added in a separated step.

At least part of the water can be added to the aqueous dispersion either under stirring or by in-line addition, i.e. introducing water in a flow of aqueous dispersion (D), generally taking advantage of the mixing effects due to the turbulent flow in a conduit.

Adding water "in-line" is a preferred solution, as it enables saving volume in the storage tanks.

In-line addition is generally performed by introducing suitable amount of water in a tube or conduit wherein the aqueous dispersion (D) is made to flow.

The solids content of the diluted aqueous dispersion (dD) can be determined according to the same method as explained for the solids content of the aqueous dispersion (D).

The solids content (SC) of the aqueous dispersion is adjusted to less than 10% by weight, preferably to 9.75% weight or less, more preferably to 9.5% weight or less.

If the solids content (SC) of the aqueous dispersion is not reduced to 10% weight or less, liquid viscosity of the corresponding aqueous dispersion, especially when the fluorinated surfactant is removed, makes pressure drop unacceptable and coagulation phenomena and jamming of the ion-exchange resin can occur.

Lower limit of solids content (SC) of the diluted dispersion is not particularly limited; it is nevertheless understood that for the economy of the process, it would be advantageous that the solids content (SC) of the aqueous dispersion is adjusted to more than 1% by weight, preferably to more than 3% weight, more preferably to more than 5% weight.

According to step (iv) of the process of the invention, the diluted aqueous dispersion (dD) is contacted with at least one adsorbing material, so as to obtain an aqueous dispersion of polymer (F) having a content of the fluorinated surfactant (FS) of less than 1 ppm based on the total weight of solids.

The diluted aqueous dispersion possesses an electrical conductivity of advantageously at least 125 µS/cm, preferably at least 150 µS/cm, more preferably at least 175 µS/cm and advantageously at most 300 µS/cm, preferably at most 275 µS/cm, more preferably at most 250 µS/cm at 25° C.

Fine tuning of the electrical conductivity of the diluted aqueous dispersion typically affects both stability of the dispersion and viscosity of the same.

The electrical conductivity can be determined according to ISO 7888 standard at 25° C.

The term "at least one adsorbing material" is understood to mean that the diluted aqueous dispersion (dD) may be contacted with one or more than one adsorbing material.

In the rest of the text, the expression "adsorbing material" is understood, for the purposes of the present invention, both in the plural and the singular.

By the term "adsorbing material" is meant materials that remove fluorinated surfactant (FS) from aqueous diluted dispersion (dD), whether through physical absorption or adsorption or chemisorption or ion-exchange or other mechanism.

Non limitative examples of adsorbing materials are notably active carbon, alumina, silica-alumina, zeolites, silica gel, and ion-exchange resin.

Preferably the adsorbing material comprises at least one ion-exchange resin.

The term "at least one ion-exchange resin" is understood to mean that the aqueous diluted dispersion (dD) may be contacted with one or more than one ion-exchange resin.

In the rest of the text, the expression "ion-exchange resin" is understood, for the purposes of the present invention, both in the plural and the singular.

More preferably, the adsorbing material is chosen among ion-exchange resins.

The term ion-exchange resin is intended to denote a solid insoluble matrix (or support structure), normally in the form of beads of reduced size (e.g. from 0.5 to 5 mm), generally fabricated from an organic polymer substrate, on the surface of which are active sites (ion-exchange sites) which easily trap and release (i.e. exchange) ions in a process called ion exchange.

The ion-exchange generally undergoes no structural change in this process of ion exchange.

An ion exchange resin can be a natural or synthetic substance which can exchange its own ions with the ions present in a liquid which is contacted with.

Thus, during step (iv) ions are advantageously exchanged between the diluted aqueous dispersion and the ion exchange resin. Thus, for instance, the anions of the fluorinated surfactant (FS) are advantageously transferred from the aqueous diluted dispersion to the ion-exchange resins. At the same time, anions initially bound to the ion-exchange resins are advantageously transferred to the aqueous diluted dispersion.

The ion-exchange resin is usually composed of synthetic beads. Each bead is a polymer matrix containing ion exchange sites on the surface and within the matrix itself.

Preferably the polymer matrix of the ion-exchange resin comprises recurring units derived from styrene (so-called polystyrene matrix) or recurring units derived from a (meth) acrylic ester (so-called acrylic matrix). The required exchange sites can be introduced after polymerization, or substituted monomers can be used. Preferably the polymer matrix is a crosslinked matrix. The crosslinking is usually achieved by adding a small proportion of divinylbenzene during polymerization. Non-crosslinked polymers are scarcely used because of their tendency to change dimensions in dependence on the ions bonded. More preferably the polymer matrix is a crosslinked polystyrene matrix.

There are multiple different types of ion exchange resin which are fabricated to selectively prefer one or several different types of ions.

Anions can only be exchanged for other anions, and cations for other cations. The ion exchange resin that is used is therefore specific for the type of fluorinated surfactant (FS) to be removed from the solution. It is also understood that the fluorinated surfactant (FS) can be adsorbed on the ion-exchange resins according to mechanisms different from ion-exchange.

An anion exchange resin has positively charged ion exchange sites with anions linked thereto, and cation exchange resins have negatively charged ion exchange site with cations linked thereto. The ion exchange resin usually originates with attached ions that have low affinities for the exchange sites. As the liquid containing ions contacts the ion-exchange resin, the ions with the most affinity for the exchange sites generally replace those with the lowest affinities. It is important, therefore, that the ion exchange resin contain ions with a lower affinity than those which need to be exchanged. Anion exchange resins often use chloride ($Cl^-$) or hydroxyl ($OH^-$) ions because of their low affinities for the exchange sites.

Preferably the ion-exchange resin of the invention comprises at least one anion exchange resin, as above defined. Generally, fluorinated surfactants (FS) are metallic or quaternary ammonium salts of anionic fluorinated species, thus an anion exchange resin is usually considered as more appropriate for its sequestration and removal.

Non limitative examples of positively charged ion exchange sites are depicted hereinafter:

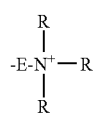

(1)

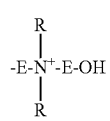

(2)

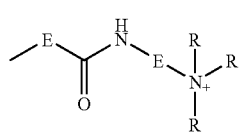

(3)

wherein, R, equal or different at each occurrence, is independently a $C_1$-$C_{12}$ hydrocarbon group or an hydrogen atom and E, equal or different at each occurrence, is independently a divalent hydrocarbon group comprising at least one carbon atom.

Preferably, the positively charged ion exchange site of the anion exchange resin are chosen among:

(1')

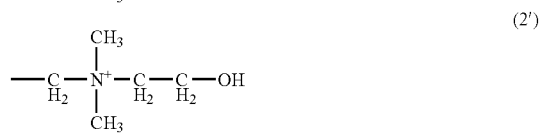

(2')

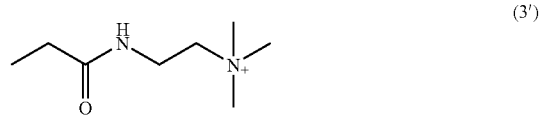

(3')

The choice of the anion bound to the positively charged ion exchange site is not critical, provided that is possesses typically less affinity to said site with respect to the anion of the fluorinated surfactant (FS).

A helpful observation in choosing a useful ion exchanger is that the pKa value of the acid corresponding to the counterion of the anion exchanger has to be advantageously higher than the pKa value of the acid corresponding to the fluorinated surfactant (FS). The anion exchanger has a counterion corresponding to an acid with a pKa value of advantageously at least 3.

The anion ion-exchange resin has preferably linked on its positively charged ion exchange sites an anion selected among the followings:
$F^-$ (pKa of HF being 3.17); $OH^-$ (pKa of $H_2O$ being 15.75); $CH_3O^-$ (pKa of $CH_3OH$ being 15.5); $(CH_3)_2CHO^-$ (pKa of $(CH_3)_2CHOH$ being 16.5); $(CH_3)_3CO^-$ (pKa of $(CH_3)_3COH$ being 17).

The anion exchanger has a counterion corresponding to an acid with a pKa value of preferably at least 5, still more preferably at least 7.

Most preferred counterion is $OH^-$.

Once the diluted aqueous dispersion has been contacted with the anion exchange resin, the resin beads generally have adsorbed or bound to their positively charged ion exchange sites, the undesirable anion of the fluorinated surfactant (FS) and the original ion which was attached to the bead can be found in the purified aqueous dispersion.

In general, the anion exchange is performed in an essentially basic environment. Diluted aqueous dispersions are generally submitted to step (iv) of the process without adjusting the pH value but the pH value may also be increased to enhance the colloidal stability of the dispersion by adding a base, such as aqueous ammonia or sodium hydroxide solution. A pH value in the range of 7 to 9 is advantageous.

Should the anion exchange resin comprise $OH^-$ anions bound to its positively charged ion exchange sites, said $OH^-$ anions are finally generally present in the purified aqueous dispersion. Therefore, the purified dispersion can undergo a sensible pH increase. As final coating composition formulation requires pH to be either neutral or slightly basic, a pH adjustment can be required.

Non limitative examples of negatively charged ion exchange sites are depicted hereinafter:

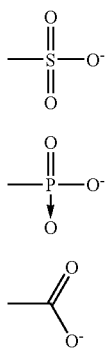

The choice of the cation bound to the negatively charged ion exchange site is not critical, provided that is possesses typically less affinity to said site with respect to the cations comprised in the diluted aqueous dispersion. For example, cation exchange resins usually come with sodium ($Na^+$) or hydrogen ($H^+$) ions attached to the exchange sites. Both of these ions have low affinities to the sites. Almost any cation which comes in contact with the cation exchange resin will have a greater affinity and replace the hydrogen or sodium ions at the exchange sites.

The cation exchange resin has preferably linked on its negatively charged ion exchange sites a hydrogen ($H^+$) ion.

Should the cation exchange resin comprise $H^+$ cations bound to its negatively charged ion exchange sites, said $H^+$ cations are finally generally present in the purified aqueous dispersion.

Thus contacting the diluted aqueous dispersion (dD) with the cation exchange resin having hydrogen ($H^+$) cation can decrease the pH of the purified dispersion.

When the aqueous dispersion is firstly contacted with an anion exchange resin, its pH generally increases; when said dispersion is further contacted with a cation exchange resin, the pH is typically made to decrease and a purified dispersion having a pH ranging from 6 to 9 can be obtained.

Ion-exchange resins are generally reversible, that is, they can be regenerated. The undesired anions from the fluorinated surfactant (FS) can be removed and replaced by the original ions by passing a solution containing these ions at high concentration. When a solution of such high concentration is passed through an ion exchange resin, the resin is typically more selective for said original ions and this, in general, because of the great number of ions bombarding the resin beads. When so many collisions occur, it is very likely that the undesired anions will be removed and replaced.

Ion exchange resins have different abilities to exchange ions, called the ion exchange capacity of the resin. This is a numerical value which represents the quantity of ions that an ion exchange resin is able to release coupled with the quantity of ions it can acquire. This exchange capacity can be expressed as an absolute number (the total exchange capacity). The total exchange capacity is measured from the time a solution is contacted with the ion-exchange resin until said ion-exchange resin cannot exchange any more ions.

It can also be advantageous to remove selected multivalent cations, like notably $Ca_{++}$, $Mg^{++}$, $Al^{+++}$, $Fe^{++}$, $Fe^{+++}$, which form insoluble salts with the fluorinated surfactant (FS) from the diluted dispersion (dD) prior to contact said dispersion with the anion exchange resins. Several cations can, for instance, be present in the diluted aqueous dispersion because they are comprised in polymerization adjuvant/additives; as an example, addition of Mohr salt as component of the redox radical initiator generates, in fine, non neglectable concentrations of iron cations in the dispersion.

To override these and other problems, according to a preferred embodiment of the invention, in step (iv) the diluted aqueous dispersion (dD) is contacted with at least one anion exchange resin and at least one cation exchange resin.

The sequence in which the diluted aqueous dispersion (dD) is contacted with both an anion and a cation exchange resin is not critical, that is to say that:

the diluted aqueous dispersion (dD) can be contacted first with the anion exchange resin, then with the cation exchange resin; and/or the diluted aqueous dispersion (dD) can be contacted first with the cation exchange resin, then with the anion exchange resin; and/or the diluted aqueous dispersion (dD) can be contacted simultaneously with a cationic exchange resin and with an anionic exchange resin.

According to a first preferred embodiment of the invention, the diluted aqueous dispersion (dD) is contacted first with the cation exchange resin, then with the anion exchange resin. This embodiment is particularly suitable when the diluted aqueous dispersion comprises multivalent cations, which generally form insoluble salts with the fluorinated surfactant (FS). This is notably the case when the polymer (F) is obtained from emulsion polymerization in the presence of a metallic salt, such as iron salts (e.g. from Mohr salt).

By first contacting the diluted aqueous dispersion (dD) with the cation exchange resin, said multivalent cations can be removed: in this way, the amount of fluorinated surfactant (FS) available for ionic exchange is advantageously increased; finally, an increased efficiency in fluorinated surfactant can be obtained.

Preferably, according to the first preferred embodiment of the invention, the diluted dispersion, prior to contact the anion exchange resins, has:

Al content of advantageously 0.25 mg/l or less; preferably 0.10 mg/l or less; more preferably 0.05 mg/l or less;

Ca content of advantageously 0.50 mg/l or less; preferably 0.20 mg/l or less; more preferably 0.10 mg/l or less;

Mg content of advantageously 0.50 mg/l or less; preferably 0.20 mg/l or less; more preferably 0.10 mg/l or less;

Fe content of advantageously 0.25 mg/l or less; preferably 0.10 mg/l or less; more preferably 0.05 mg/l or less.

Determination of said elements content can be notably carried out by inductively coupled plasma optical emission spectrometry according to ISO/DIS 11885 method.

Preferably, the process according to this first embodiment comprises (a) contacting the diluted aqueous dispersion (dD) with the cation exchange resin, (b) then contacting the same with the anion exchange resin, and repeating at least one of steps (a) and/or (b) here above.

Even more preferably, the process according to this first embodiment comprises two sets of step (a) followed by step (b) as above detailed, that is to say that the diluted dispersion is submitted to an ion exchange treatment with, in sequence, cationic ion exchange resin/anionic ion exchange resin/cationic ion exchange resin/anionic anion exchange resin.

According to a second embodiment of the invention, the aqueous diluted dispersion (dD) is first contacted with the anion exchange resin, then with the cation exchange resin.

By contacting the diluted aqueous dispersion (dD) with the cation exchange resin after having contacted it with the anion exchange resin, it is possible to finely adjust the final pH of the dispersion.

Preferably, the process according to this second embodiment comprises (a') contacting the diluted aqueous dispersion (dD) with the anion exchange resin, (b') then contacting the same with the cation exchange resin, and repeating at least one of steps (a') and/or (b') here above.

Even more preferably, the process according to this second embodiment comprises two sets of step (a') followed by step (b') as above detailed, that is to say that the diluted dispersion is submitted to an ion exchange treatment with, in sequence, anionic ion exchange resin/cationic ion exchange resin/anionic anion exchange resin/cationic ion exchange resin.

The contact time or residence time between the diluted aqueous dispersion (dD) and the adsorbing material (or in other words, the amount of dispersion (dD) which passes through the ion exchange resin per unit of time with respect to the volume of the said ion exchange) will be chosen by the skilled in the art according to the practice common in the art.

Should the step (iv) be carried out in a discontinuous manner, the contact time is advantageously of at least 0.5 hours, preferably of at least 1 hour, and is advantageously of at most 10 hours, preferably of at most 8 hour.

Should the step (iv) be carried out in a continuous manner, the residence time is advantageously of at least 0.1 hours, preferably of at least 0.2 hour, and is advantageously of at most 10 hours, preferably of at most 8 hour.

As per the temperature of step (iv), it is generally needed to be kept constant, because temperature changes can typically affect the adsorbing kinetics and capabilities of adsorbing material; for instance, it is well-known that the size of the pores of an ion exchange resin can be modified by temperature changes.

It is generally preferred to carry out step (iv) at a temperature of advantageously at least 20° C., preferably at least 25° C., more preferably at least 30° C.

Upper temperature is not particularly limited, provided that the diluted aqueous dispersion (dD) and the adsorbing material remains advantageously stable at that temperature. It is thus understood that step (iv) is generally carried out at a temperature of advantageously at most 50° C., preferably at most 45° C., more preferably at most 40° C.

Step (iv) can be notably carried out by contacting the diluted aqueous dispersion (dD) with a bed of the ion-exchange resin. Standard equipments such as tower or column can be used. In this case, the step (iv) is advantageously operated continuously, by making a flow of aqueous diluted dispersion (dD) passing through a bed of the ion-exchange resin. The flow rate is not critical, standard flow rates can be used. The flow can be upward or downward.

The ion-exchange resin may be arranged in one or more than one bed. Said bed(s) are generally arranged vertically in suitable columns or towers. The diluted aqueous dispersion (dD) is generally made flowing through the ion-exchange resins by suitable pumping means. Preferred are pumps which submit diluted dispersion to low shear conditions. Suitable filters, nets or other retaining means enable containment of the ion exchange resins in the column(s) and effective separation therefrom of the purified diluted dispersion.

As an alternative, step (iv) can also be carried out by mildly stirring the aqueous dispersion with the ion exchange resin in a vessel. The process can be operated as a batch process or as continuous process. The Applicant has surprisingly found that conducting step (iv) by mildly stirring in a vessel, ion exchange resins are advantageously very well dispersed in the fluoropolymer dispersion at the level of single granules without any agglomerates and fluoropolymer particles entrapment. This is in contrast to the processes of prior art for the treatment of high solids content fluoropolymer dispersions when ion exchange resins flotate at the beginning of the treatment, and then forms agglomerates with the entrapment of fluoropolymer particles.

At the end of this treatment the aqueous dispersion is generally isolated by filtration, but any other separation technique (decantation, settling, etc...) can be used.

The purified aqueous dispersions of fluoropolymer generally undergo a further concentration step for achieving the above mentioned high solids content required for storage and transport and for application as a coating.

The process of the invention generally further comprises a step (v) comprising concentrating the purified aqueous dispersion.

Thus, subsequent to step (iv), the purified dispersion can be concentrated to increase the solids content up to at most 75% wt.

The concentrated purified dispersion can be notably obtained with anyone of the processes known in the art.

As an example, the concentrated purified dispersion can be notably obtained by the addition of a nonionic surfactant and by heating above the cloud point of the above-mentioned nonionic surfactant and separating the supernatant water phase from the polymer (F)-rich phase (so-called clouding process).

Otherwise, the concentrated purified dispersion can be obtained by the ultra-filtration method, well-known to those skilled in the art.

According to a preferred embodiment of the invention, the process comprises a further concentration step by the ultra-filtration method; according to this embodiment, the purified dispersion is filtered through selective semi-permeable membranes, which enable separation of a concentrated dispersion from a fraction of the liquid phase (waste waters).

Preferably, the diluted dispersion is filtered in tangential filter device. Generally the tangential filter device is composed of a semi-permeable membrane tube contained in an external jacket (generally a metallic or plastic jacket), said tube and said jacket being kept aside each other by suitable means, and said tangential filter being equipped with suitable means for withdrawing waste waters from the membrane tube/external jacket cylindrical interstice.

No impairment of these processes could be observed due to the process of the invention. There are moreover no changes in end user processing or end use properties for such dispersions according to the invention.

FIG. 1 depicts a first embodiment of the process of the invention.

A fluoropolymer aqueous dispersion (1) and a non ionic surfactant (2) are added to a stirred tank (3) wherein a homogeneous mixture of aqueous dispersion (D) and non-ionic surfactant can be obtained and stored. Suitable pumping means (5) enable flowing the aqueous dispersion through a conduit (6) wherein a flow of water (7) is metered by means of appropriated metering means (not shown) and injection means (not shown). The diluted aqueous dispersion obtained in the conduit (8) is passed though a first column (9) comprising anion exchange resins and is withdrawn through conduit (10) towards a further column (9') also comprising anion exchange resins. Withdrawal means and conduit (10') drive the dispersion through column (11) comprising cation exchange resin. Purified dispersion withdrawn trough conduit (12) is fed to a storage tank (13). Suitable pimping means (16) feed said purified dispersion to an ultrafiltration unit (17)

wherein a semi-permeable membrane separate waste water (18) from concentrated dispersion (19). Concentrated dispersion is recycled to the storage tank (13) and re-circulated through the ultrafiltration unit (17) until the final solids concentration is achieved. Once the target solids concentration is obtained, discharge valve (14) is opened and the concentrated purified aqueous dispersion (15) is recovered for formulation and/or further processing. The waste water (18), permeate from semi-permeable membrane, which might contain small amount of non-ionic surfactant (NS), might be submitted to additional treatment before final disposal; e.g. non-ionic surfactant can be notably recovered therefrom using technologies well-known to those skilled in the art, like, for instance, reverse osmosis (RO) concentration process.

Figure 2:
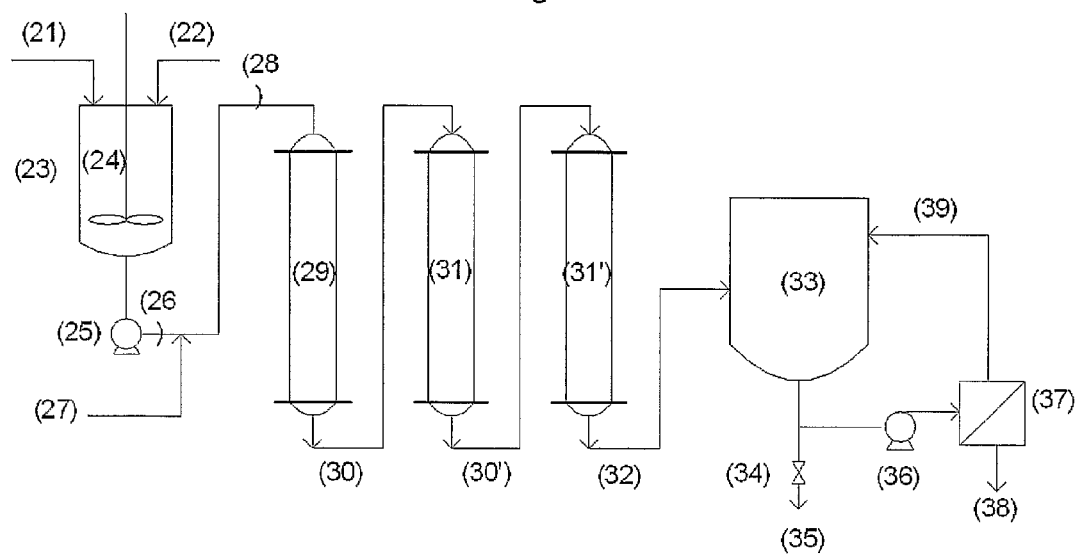

FIG. 2 depicts a second preferred embodiment of the process of the invention.

A fluoropolymer aqueous dispersion (21) and TERGITOL™ TMN-X100 (non ionic surfactant) (22) are added to a stirred tank (23) wherein a homogeneous mixture of aqueous dispersion (D) and non-ionic surfactant can be obtained and stored. Suitable pumping means (25) enable flowing the aqueous dispersion through a conduit (26) wherein a flow of water (27) having a content of Al of less than 0.05 mg/l, a content if Ca of less than 0.1 mg/l, a content of Mg of less than 0.1 mg/l and a content of Fe of less than 0.05 mg/l is metered by means of appropriated metering means (not shown) and injection means (not shown). The diluted dispersion obtained in the conduit (28) is passed though a first column (29) comprising cation exchange resins for further reducing polyvalent cations content, and is withdrawn through conduit (30) towards a column (31') comprising anion exchange resins. Withdrawal means and conduit (30') drive the dispersion through a further column (31') comprising anion exchange resin. Purified dispersion withdrawn trough conduit (32) is fed to a storage tank (33). Suitable pumping means (36) feed said purified dispersion to an ultrafiltration unit (37) wherein a semi-permeable membrane separate waste water (38) from concentrated dispersion (39). Concentrated dispersion is recycled to the storage tank (33) and recirculated through the ultrafiltration unit (37) until the final solids concentration is achieved. Once the target solids concentration is obtained, discharge valve (34) is opened and the concentrated purified aqueous dispersion (35) is recovered for formulation and/or further processing. As already mentioned, the waste water (38), permeate from semi-permeable membrane, which might contain small amount of non-ionic surfactant (NS), might be submitted to additional treatment before final disposal; e.g. non-ionic surfactant can be notably recovered therefrom using technologies well-known to those skilled in the art, like, for instance, reverse osmosis (RO) concentration process.

Still an object of the invention is an aqueous polymer (F) dispersion comprising:
- at least one fluoropolymer [polymer (F)];
- at least one non-ionic surfactant [surfactant (NS)];
- at least one fluorinated surfactant [surfactant (FS)] in an amount of less than 1 ppm with respect to the total weight of solids.

The process of the invention is particularly suitable for obtaining the dispersion as above described; nevertheless, said dispersion can be obtained by any suitable means.

The features of polymer (F), surfactant (NS) and surfactant (FS) are those above detailed.

The aqueous dispersion of polymer (F) of the invention comprises preferably 0.8 ppm or less, more preferably 0.75 ppm or less, most preferably 0.5 ppm or less of fluorinated surfactant (FS), based on the total weight of solids.

Advantageously, the dispersion of the invention possesses:
an Al content of 0.25 mg/l or less
a Ca content of 0.5 mg/l or less
a Mg content of 0.5 mg/l or less
a Fe content of 0.25 mg/l or less.

Preferably, the dispersion of the invention possesses:
an Al content of 0.10 mg/l or less
a Ca content of 0.2 mg/l or less
a Mg content of 0.2 mg/l or less
a Fe content of 0.10 mg/l or less.

More preferably, the dispersion of the invention possesses:
an Al content of 0.05 mg/l or less
a Ca content of 0.1 mg/l or less
a Mg content of 0.1 mg/l or less
a Fe content of 0.05 mg/l or less.

Determination of said elements content can be notably carried out by inductively coupled plasma optical emission spectrometry according to ISO/DIS 11885 method.

The aqueous polymer (F) dispersion of the invention possesses an electrical conductivity of advantageously at least 225 µS/cm, preferably at least 250 µS/cm, more preferably at least 275 µS/cm and advantageously at most 450 µS/cm, preferably at most 425 µS/cm, more preferably at most 400 µS/cm at 25° C.

Fine tuning of the electrical conductivity of said dispersion generally strongly affects both stability of the dispersion and viscosity of the same are strongly affected by this parameter.

The electrical conductivity can be determined according to ISO 7888 standard at 25° C.

The aqueous polymer (F) dispersion of the invention or obtained by the process as above detailed can be suitably formulated in connection with the targeted specific application by addition e.g. of other aqueous resin dispersions, such as, acrylic resins, silicone resins, polyamidoamide resins, imide resins, etc.; pigments, surfactants, inorganic fillers and other additives, such as antifoam agents, extending agents, etc.

The aqueous polymer (F) dispersion of the invention or obtained by the process as above detailed can be advantageously used for coating applications on metal surfaces and ceramic surfaces, in the textile impregnation and for obtaining cast films.

The present invention will be now described in more details with reference of the following examples, whose propose is merely illustrative and not intended to limit the scope of the invention.

Analytical Methods

The percentages given in the examples are by weight, unless otherwise noted.

Average Particle Diameter Determination in the Latex

The average diameter has been determined by a Spectra-Physics laser light diffusion instrument based on the Photon Correlation Spectroscopy (PCS), equipped with a correlator Brookhaven model 2030 AT and Ar laser light source at a wavelength of 514.5 nm. Latex specimens have been diluted with water filtered on a 0.2 µm Millipore filter.

The average primary particle size of the polymer (F) particles has been measured according to the method described in Non Patent Citation 0004: CHU, B. *Laser light scattering*. Academic Press: New York, 1974,
following ISO 13321 Standard.

Following ISO 13321 Standard, the average particle size of primary particles was determined by equation (C10) of annex C of ISO 13321 as the harmonic intensity-averaged particle diameter $X_{PCS}$.

Determination of the Solids Content of Polymer (F) Dispersions

Solids content of the aqueous dispersions was determined by weighting a portion (roughly 20 grams) of the aqueous dispersion in an open glass container, putting said filled glass container in an oven for 1 hour at a temperature of 105° C., and weighting the solids residue thereof; solids content was thus determined according to the following equation:

$$\text{Solids content } (\%) = \frac{\text{weight of solid residue at } 105°\text{ C.}}{\text{weight of aqueous dipersion}} \cdot 100 \quad [\text{Math. 0003}]$$

Determination of the Polymer and Nonionic Surfactant Content in Concentrated Dispersions About 1 g of the concentrated dispersion was weighted in an aluminium vessel and dried in an oven at 105° C. for 1 hour. After weighting, the container was placed in an oven at 400° C. for 10 minutes (sintering step). Based on the final weight, the polymer content in the concentrated dispersion was given by the following formula:

$$\text{Polymer } (F) = \frac{\text{Weight of solid sintered residue at } 400°\text{ C.}}{\text{weight of aqueous dipersion}} \cdot 100 \quad [\text{Math. 0004}]$$

The nonionic surfactant content in the concentrated dispersion was determined according to the following formula:

$$\text{Surfactant } (NS) = \frac{\text{Weight of solid residue at } 105°\text{ C.} - \text{Weight of sintered residue at } 400°\text{ C.}}{\text{weight of aqueous dipersion}} \cdot 100 \quad [\text{Math. 0005}]$$

Determination of Polyvalent Cations Concentration in Water

Determination of concentration of polyvalent cations, expressed as element content, can be notably carried out by inductively coupled plasma optical emission spectrometry according to ISO/DIS 11885 method.

Fluorinated Surfactant (FS) Determination

Fluorinated surfactant (FS) content was determined by converting said surfactant (FS) in its corresponding methyl ester and quantitatively determining its concentration by gas-chromatographic method (GC).

The method used for determining the residual concentration of fluorinated surfactant in the dispersions is described in more detail herein below.

The required amount of the polymer (F) dispersion is carefully weighted in a Pyrex® vial; a few drops of aqueous ammonia (30% wt) are added to set pH at roughly 11. The dispersion is then dried in oven at 80° C. for 3 hours.

An aliquot of methanol containing 1% wt of sulphuric acid is then added to the mixture and the vial is sealed with a stopcock and kept in oven for 16 hours at 70° C.

At room temperature, an aliquot of A 113 is added to the mixture. After decanting polymer (F), a well-defined amount of the clear solution is transferred in a further vial; deionized water is then added and fluorinated phase (bottom phase) is separated and washed again with deionized water.

Said fluorinated phase is analyzed by GC, using a gas-chromatograph equipped with a Supelco™-1 fused silica capillary column and an Electron Capture Detector (ECD) from Thermo Finningan.

Quantitative determination of fluorinated surfactant (FS) content is obtained from suitable calibration curves from standard stock dispersion.

Treatment of the Dispersion with the Ion Exchange Resin: Batch Procedure

The required amount of dispersion to be treated was transferred in a container and stabilized with the chosen nonionic surfactant in the quantity indicated in the specific examples. The dispersion was then gently stirred with a two-blade mechanical stirrer at the temperature indicated in each example.

The ion-exchange resin to be used was pre-treated with a 1% solution of the nonionic surfactant of choice in order to avoid the formation of resin bead aggregates in the dispersion.

The excess surfactant solution was carefully removed before using the resin. The resin was added to the dispersion under stirring in the amount of 5% referred to the weight of the dispersion for anionic exchange resin, and 3% for the cationic resin. After dispersing the resin homogeneously in the aqueous dispersion, the system was left under stirring for the contact time indicated in the examples.

The aqueous dispersion was filtered from the resin and the content of the residual anionic fluorinated surfactant (FS) was determined.

The sequence according which the different ion exchangers were contacted with the dispersion is described in detail for each example and summarized in Table 1 here below.

Cast Film Deposition Process

A polyimide film support was totally immersed in a bath containing the concentrated dispersion at a dragging rate equal to 1.2 m/min. The excess of the dispersion was removed from the support by two pressing bars. Subsequently, the coated film was dried at 120° C. and sintered at 350° C. for about 30 sec time in a vertical tower. Coating and subsequent sintering processes were repeated 5 times in order to have a polymer film thickness of about 50 μm. The wetting properties of the dispersion were evaluated by detecting the absence of defects such as fish-eyes during the process. The coated film was then mechanically detached from the solid support to be characterized. The presence of defects (such as cracks and/or lumps) was evaluated with an optic microscope at a 10×10 magnification, and the degree of whiteness was qualitatively determined by comparison with other films obtained from different examples.

pH Measurement

The determination was performed using a standard pH-meter at a temperature of 25° C.

Electrical Conductivity

The determination was performed on a Crison mod.525 conductimeter at a temperature of 25° C. according to ISO 7888 standard.

Brookfield Viscosity

The viscosity in centipoises (1 cps=1 mPa·s) was measured with a Brookfield viscosimeter RVT at 35° C., equipped with probe 1 (2-400 centipoises-cP) on a 500 ml sample placed in a 600 ml open glass container.

Determination of the Coagulum Amount Present in the Dispersion, Calculated with Respect to the Polymer (F) Content of Concentrated Dispersions 500 g of the concentrated dispersion were filtered through a non-woven nylon net of known weight with mesh equal to 10 µm. At the end of the filtration 500 ml of water were made to pass through the net to remove the excess of dispersion from the net. The net with the optional residue was dried in an oven at 105° C. for 1 hour and then weighed. The amount of coagulum was determined by the difference in weight with respect to the initial weight of the net. By dividing such difference by the amount of polymer (F) contained in 500 g of said dispersion and multiplying it by 100, the percentage of coagulum in the polymer (F) was determined. The sensitivity limit of the method is 0.005% based on the weight of the polymer.

Determination of Micro-aggregates by Deposition of a Polymer (F) Film on a Glass Support 10 ml of the concentrated dispersion to be tested were poured repeatedly onto a carefully cleaned optic microscope examination glass, which was then left at a 90° inclination in order to obtain a film that revealed the presence of micro-aggregates. The film was then evaluated with the optic microscope Axioskop from Carl Zeiss at a magnification of 2.5×10 with a 90° polarized light source: the micro-aggregates were detected as light points on the film surface. The visual analysis was carried out on three different areas of standardized surface of the coated examination glass surface and the final datum was reported as average of the three counts.

Polymerization Runs

EXAMPLE 1

In a 440-liter autoclave under vacuum and equipped with a mechanical stirrer 98 g of anmoniun perfluorooctanoate (APFOA) were transferred in an aqueous solution at a concentration of 347 g/liter, along with 275 liters of accurately degassed deionized water having a conductivity of 0.4 µS/cm and following composition: Al<0.05 mg/l; Ca<0.1 mg/l; Mg<0.1 mg/l; Fe<0.05 mg/l.

Previously the autoclave had been loaded with 4 kg of paraffin having a softening point of 52-54° C.

While stirring, the autoclave was pressurized with TFE up to a pressure of 20 bar and the temperature is raised to 68° C. The autoclave was then loaded with 4.50 liter of a solution containing 3.56 g of $(NH_4)_2S_2O_8$ (APS) and 17.74 g of disuccinic acid peroxide (DSAP).

When the pressure dropped by 0.5 bar, TFE was fed in the solution by using a compressor, and a constant pressure of 20 bar was maintained in the autoclave. Meanwhile, the temperature in the autoclave was raised to 78° C. at a rate of 0.50 C/min. During the reaction 450 g of a concentrated aqueous solution (347 g/liter) of APFO was fed into the autoclave.

After 90 minutes, which corresponded to the time needed to react 140 Kg of TFE, feeding was interrupted; the autoclave was degassed, and allowed to cool down. The so obtained latex had a solids content of about 30% (w/w).

The average primary particle diameter determined by Photon Correlation Spectroscopy (PCS) as above detailed was found to be 240 nm. The PFOA content was 3950 ppm with respect to the total weight of solids.

EXAMPLE 2

3180 g of APFOA were weighed and added to 265 liters of accurately degassed deionized water having a conductivity of 0.4 µS/cm and following composition Al<0.05 mg/l; Ca<0.1 mg/l; Mg<0.1 mg/l; Fe<0.05 mg/l, and subsequently fed to a 440 liters autoclave previously put under vacuum and equipped with a mechanical stirrer. Before adding the PFOA solution, the autoclave was loaded with 4 kg of paraffin having a softening point of 52-54° C., and with 202 g of hexafluoropropene (HFP).

While stirring, the pressure in the autoclave was raised to 20 bar with TFE and the temperature was raised to 75° C. The autoclave was then loaded with 4500 ml of a solution containing 22 mg of APS.

As soon as the pressure within the vessel dropped by 0.5 bar, TFE was fed into the autoclave by using a compressor, and a constant pressure of about 20 bar was maintained.

Meanwhile, the temperature inside the autoclave was raised to 85° C. at a rate of 0.2° C./min.

After 70 minutes, which correspond to the time needed to react 50.2 Kg of TFE, feeding was stopped and the reactor was degassed and allowed to cool down. The so obtained latex had a solid content of about 15% (w/w).

The % weight of HFP in the polymer is about 0.4%. The average primary particle diameter determined by PCS wax 78 nm. The content of PFOA was 66150 ppm with respect to the total weight of solids.

EXAMPLE 1bis (µ EMULSION POLYMERIZATION)

In a plastic drum were introduced:
35 parts of an ammonium salt of a perfluoropolyether surfactant having formula $ClC_3F_6(C_3F_6O)_nCF_2COOH$, wherein n can range from 1 to 3, with an acidimetric molecular weight equivalent to 479,
15 parts of a perfluoropolyether having formula: $R_fO(C_3F_6O)_n(CFXO)_mR'_f$ wherein n' and m' are integers such as to have an average molecular weight of 700 and
50 parts of water are introduced.

The resulting microemulsion was found to be perfectly limpid. In a 2000 liter autoclave under vacuum and equipped with a mechanical stirrer 44.0 kilograms of the above described microemulsion, equivalent to 3.7 ml/l of perfluoropolyether surfactant, were mixed with 1380 liters of accurately degassed deionized water having a conductivity of 0.4 µS/cm and following composition: Al<0.05 mg/l; Ca<0.1 mg/l; Mg<0,1 mg/l; Fe<0,05 mg/l and with 2 kg of paraffin having a softening point of 52-54° C.

4200 grams of perfluoropropylvinylether (PPVE) were also introduced in the reactor together with 100 mbar of ethane. While stirring, the autoclave was pressurized with TFE up to a pressure of 20 bar and the temperature was raised to 75° C. Then, 5 liters of a $(NH_4)_2S_2O_8$ (APS) solution corresponding to 75.0 grams of APS were fed into the autoclave. TFE was fed by a compressor so as to maintain a constant pressure of 20 bar inside the reactor, each time the inner pressure in the reactor decreased of 0.5 bar. Reactor temperature set point was set at 90° C. After 70 min, corresponding to the reaction of about 400 kg of TFE, the TFE feeding was stopped, the reactor evacuated and cooled. The so obtained latex had a solids content of 22.7% (w/w) and a PPVE content of 0.7%(w/w) based on the total weight of the polymer.

The average primary particle diameter determined by Photon Correlation Spectroscopy (PCS) as above detailed was found to be 52 nm. The fluorinated surfactant content was 37000 ppm with respect to the total weight of solids.

Ion-Exchange Purification and Concentration Tests

EXAMPLE 4

10.56 liters of the dispersion obtained from example 1 were placed in a 40 liters drum and diluted with a solution of 667 g of TERGITOL™ TMN100X dissolved in 29.44 liters of water having a conductivity of 0.4 µS/cm and following composition: Al<0.05 mg/l; Ca<0.1 mg/l; Mg<0.1 mg/l; Fe<0.05 mg/l.

The resulting dispersion has a PTFE content of 9.5% (w/w), nonionic surfactant content of 1.5% on the dispersion, and pH equal to 3.5.

The dispersion was treated with the cation exchange resin DOWEX® Mac3 in the H$^+$form, following the procedure outlined above for 3 hours; at the end of the treatment the resin was separated by filtration.

Subsequently, the dispersion was treated with the anion exchange resin AMBERJET® 4400 in the OH$^-$ form, following the procedure outlined above for 6 hours; the resin was then separated by filtration. All ion exchange treatments were carried out at 32° C. Above detailed sequence of treatments were repeated on the dispersion contacting the latter again with a cation exchange resin and, subsequently, with an anion exchange resin.

The content of PFOA was measured as previously described. The measured value was 0.4 ppm, referred to the weight of the solids.

The ionic strength of the dispersion is adjusted by addition of 200 ppm of ammonium nitrate referred to the weight of the dispersion.

All conditions set for the treatments performed on the dispersion can be found in table 1.

The dispersion was loaded into a 40 liter tank and by using a centrifuge pump, the latex was made to circulate under pressure through a semi-permeable membrane in order to concentrate the aqueous dispersion by removing water.

After 4 hours, the concentrated dispersion was recovered from the process tank. The latex had a PTFE content of 62.3% (w/w), a nonionic surfactant content of 3.3% referred to the polymer weight, and a conductivity of 350 µS/cm.

The concentrated dispersion was formulated with TERGITOL™ TMN100X dissolved in water having a conductivity of 0.4 µS/cm and following composition: Al<0.05 mg/l; Ca<0.1 mg/l; Mg<0.1 mg/l; Fe<0.05 mg/l, in order to obtain a dispersion having a PTFE content of 60% referred to the weight of the dispersion, and a nonionic surfactant content (TERGITOL™ TMN100X) of 5% referred to the polymer weight.

The presence of coagulum was undetectable.

The viscosity measured at 35° C. was 18 cps. Micro-aggregates were absent. The cast film did not show evidence of lumps and/or cracks, and was colourless.

Fish-eye defects were not detected during cast film deposition process.

All tests and measurements are carried out according to the procedures described above and all the data are reported in tables 2 and 3.

EXAMPLE 5

21.6 liters of the dispersion obtained from example 2 were placed in a 40 liter drum and diluted with a solution of 667 g of TERGITOL® TMN100X dissolved in 184 liters of water having a conductivity of 0.4 µS/cm and following composition: Al<0.05 mg/l; Ca<0.1 mg/l; Mg<0.1 mg/l; Fe<0.05 mg/l.

The resulting dispersion had a solids content of 9.0% (w/w), and a nonionic surfactant content of 1.5% on the dispersion.

Firstly, the dispersion was treated with the cation exchange resin DOWEX® Mac3 in the H$^+$ form for 3 hours; the ion exchange resin was then filtered off. Then, the dispersion was treated with the anion exchange resin ABERJET® 4400 in the OH$^{31}$ form, for 6 hours; the ion exchange resin was then filtered off. Above detailed sequence of treatments were repeated on the dispersion contacting the latter again with a cation exchange resin and, subsequently, with an anion exchange resin.

All ion exchange treatments were carried out at 35° C. The content of PFOA, measured according to the method described above was found to be 0.5 ppm, referred to the total weight of solids.

The ionic strength of the dispersion was adjusted by addition of 400 ppm of ammonium nitrate referred to the weight of the dispersion.

All conditions set for the treatments performed on the dispersion can be found in table 1.

The dispersion was loaded into a 40 liter tank and by using a centrifuge pump, the latex was made to circulate under pressure through a semi-permeable membrane in order to concentrate the aqueous dispersion by removing water.

After 4 hours, the concentrated dispersion was recovered from the process tank. The latex has a PTFE content of 50.8% (w/w), a nonionic surfactant content of 10.4% referred to the polymer weight, and conductivity of 700 µS/cm.

The concentrated dispersion was mixed with the dispersion obtained from example 4 in order to have a final dispersion comprised of a 10/90 ratio (w/w) of example 2/example 1 polymers. The obtained mixture was formulated with TERGITOL™TMN100X dissolved in water having a conductivity of 0.4 µS/an in order to obtain a dispersion having a PTFE content of 60% referred to the weight of the dispersion, and a nonionic surfactant content (TERGITOL™ TMN100X) of 5% referred to the polymer weight.

The presence of coagulum was undetectable. The viscosity measured at 35° C. was 20 cps. Micro-aggregates were absent. The cast film did not show evidence of lumps and/or cracks, and was colourless. Fish-eye defects were not detected during cast film deposition process.

All tests and measurements were carried out according to the procedures described here above and all the data are reported in tables 2 and 3.

EXAMPLE 6

10.56 liters of the dispersion obtained from example 1 were placed in a 40 liters drum and diluted with a solution of 667 g of TERGITOL™ TMN100X dissolved in 21.44 liters of water having a conductivity of 0.4 µS/cm and following composition: Al<0.05 mg/l; Ca<0.1 mg/l; Mg<0.1 mg/l; Fe<0.05 mg/l.

In addition, 8 liters of isopropyl alcohol were added to the dispersion.

The resulting dispersion had a solids content of 9.5% (w/w), and nonionic surfactant content of 1.5% on the weight of the dispersion.

The dispersion was treated with the cation exchange resin DOWEX® Mac3 in the H$^+$ form for 3 hours, and at the end of the treatment the ion exchange resin was filtered off.

Subsequently, the dispersion was treated with the anion exchange resin AMBERJET® 4400 in the OH$^-$ form, for 6 hours; then, the resin was filtered off. All ion exchange treatments were carried out at 30° C. Above detailed sequence of treatments were repeated on the dispersion contacting the latter again with a cation exchange resin and, subsequently, with an anion exchange resin.

The content of PFOA, measured according to the method above described was found to be 0.2 ppm, referred to the total weight of the solids.

The ionic strength of the dispersion was then adjusted by addition of 500 ppm of ammonium sulphate referred to the weight of the dispersion.

All conditions set for the treatments performed on the dispersion can be found in table 1.

The dispersion was loaded into a 40 liter tank and by using a centrifuge pump, the latex was made to circulate under pressure through a semi-permeable membrane in order to concentrate the aqueous dispersion by removing water. After 4 hours, the concentrated dispersion was recovered from the process tank. The dispersion had a PTFE content of 62.4% (w/w), a nonionic surfactant content of 2.9% referred to the polymer weight.

The concentrate dispersion was formulated with TERGITOL™ TMN100X dissolved in water in order to obtain a dispersion having a PTFE content of 60% referred to the weight of the dispersion, and a nonionic surfactant content (TERGITOL™ TMN100X) of 5% referred to the polymer weight.

The presence of coagulum was undetectable. The viscosity measured at 35° C. was 15 cps. Micro-aggregates were absent. The cast film did not show evidence of lumps and/or cracks, and was colourless.

Fish-eye defects were not detected during the cast film deposition process.

All tests and measurements were carried out according to the procedures described above and all the data are reported in tables 2 and 3.

EXAMPLE 7

8000 liters of a PTFE dispersion, obtained by scaling up the polymerization conditions given in Example 1 on an industrial reactor, were charged in a stirred tank and stabilized with TERGITOL™ TMN100X.

The dispersion was contacted with ion exchange resins and concentrated by ultra-filtration according to the process layout sketched in FIG. 2, comprising:
  pumping the stabilized dispersion through the conduit (26) in combination with a flow of water, having a conductivity of 0.4 µS/cm and composition: Al<0.05 mg/l; Ca<0.1 mg/l; Fe<0.05 mg/l, in order to dilute said dispersion: the diluted dispersion had a solids content of 8.5% (w/w), a nonionic surfactant content of 0.65% (w/w), a PFOA content of=4082 ppm with respect to the total weight of solids, a pH of 3,4 and was at a temperature of 32° C.;
  passing said diluted dispersion through a column (29) filled with cation exchange resin DOWEX® Mac3 in H+ form and then through two columns (31 and 31') filled with anion exchange resin AMBERJET® 4400 in the OH− form;
  collecting the purified dispersion, having a fluorinated surfactant (PFOA) content of 0,4 ppm, referred to the weight of the solids, into a stirred tank (33) and adding 230 ppm of ammonium nitrate;
  pumping said purified dispersion through the ultrafiltration unit (37) to separate waste water from concentrate dispersion;
  recycling the concentrated dispersion into the storage tank and re-circulating through the ultrafiltration unit until the concentration reached the desired final solid content.

The resulting concentrated dispersion had a solids content of 61.6% (w/w), a nonionic surfactant content (TERGITOL™ TMN100X) of 2% (w/w), a fluorinated surfactant (PFOA) content of 0.4 ppm, referred to the weight of the solids, a conductivity of 260 microS/cm and a pH=9.9

The concentrated dispersion was formulated with TERGITOL™ TMN100X in order to obtain a PTFE content of 60% (w/w) and a nonionic surfactant content of 5% (w/w) referred to the polymer weight.

The presence of coagulum was undetectable.

The viscosity measured at 35° C. was 18 cps. Micro-aggregates ware absent. The cast film did not show evidence of lumps and/or cracks, and was colourless.

Fish-eye defects were not detected during cast film deposition process.

All tests and measurements are carried out according to the procedures described above and all the data are reported in tables 2 and 3.

COMPARATIVE EXAMPLE 2

28 liters of the dispersion obtained from example 1 were placed in a 40 liter drum and then diluted with a solution of 600 g of TRITON® X100 dissolved in 12 Kg of water having a conductivity of 0.4 µS/cm and following composition: Al<0.05 mg/l; Ca<0.1 mg/l; Mg<0.1 mg/l; Fe<0.05 mg/l. The resulting dispersion had a solids content of 22% referred to the weight of the dispersion and a content of nonionic surfactant of 1.5% referred to the weight of the dispersion.

Firstly, the dispersion was treated with the anion exchange resin AMBERJET® 4400 in the OH− form, for 6 hours; at the end of the treatment the ion-exchange resin was easily filtered off. The dispersion was then treated with the cation exchange resin DOWEX® Mac3 in the H+ form, for 3 hours and the ion-exchange resin was filtered off. All ion exchange treatments were carried out at 20° C. Above detailed sequence of treatments were repeated on the dispersion contacting the latter again with the cation exchange resin and, subsequently, with the anion exchange resin.

The content of PFOA measured according to the method described here above was found to be 4.1 ppm, referred to the weight of solids.

All conditions set for the treatments performed on the dispersion can be found in table 1.

The dispersion was concentrated via the same process described in the previous examples and the resulting latex had a PTFE content of 63.4% (w/w), a nonionic surfactant content of 2.9% referred to the polymer weight.

The concentrate dispersion was formulated with TRITON® X100 dissolved in water in order to obtain a dispersion having a PTFE content of 60% referred to the weight of the dispersion, and a nonionic surfactant content (TRITON® X100 ) of 5% referred to the polymer weight.

The coagulum was found to account for 0.015%. The viscosity measured at 35° C. was 50 cps. 2 micro-aggregates were detected in the film optical test. The cast film did not show evidence of lumps and/or cracks, but yellowish coloration was observed. Fish-eye defects were detected during the cast film deposition process.

All tests and measurements were carried out according to the procedures described here above and all the data are reported in tables 2 and 3.

COMPARATIVE EXAMPLE 3

28 liters of the dispersion from example 1 are placed in a 40 liter drum and then diluted with a solution of 600 g of TRITON® X100 dissolved in 12 Kg of water having a conductivity of 0.4 µS/cm and following composition: Al<0.05 mg/l; Ca<0.1 mg/l; Mg<0.1 mg/l; Fe<0.05 mg/l. The resulting dispersion had a solids content of 22% and a content of nonionic surfactant of 1.5% referred to the weight of the dispersion.

The dispersion was concentrated via the same process described in the previous examples and after 3.5 hours, the concentrated dispersion was recovered from the process tank: the PTFE content was 52% referred to the weight of the dispersion and the content of nonionic surfactant was 2.8% referred to the weight of the dispersion.

Subsequently, the dispersion was treated with the anion exchange resin AMBERJET® 4400 in the OH form, following the procedure outlined above for 6 hours, and at the end of the treatment the ion-exchange resin was filtered off. Above detailed sequence of treatments were repeated on the dispersion contacting the latter again with the cation exchange resin and, subsequently, with the anion exchange resin.

The resulting dispersion was treated with the cation exchange resin DOWEX® Mac3 in the H⁺ form, following the procedure outlined above for 3 hours, and at the end of the treatment the ion-exchange resin was filtered off. All ion exchange treatments were carried out at 21° C.

The content of PFOA measured according to the method above described was found to be 4.8 ppm, referred to the weight of the solids.

All conditions set for the treatments performed on the dispersion can be found in table 1.

The dispersion was again concentrated via the same process described in the previous examples to raise the solids content up to 62.7% (w/w), and to a nonionic surfactant content of 3.1% referred to the polymer weight.

The concentrated dispersion was formulated with TRITON® X100 dissolved in water in order to obtain a dispersion having a PTFE content of 60% referred to the weight of the dispersion, and a nonionic surfactant content (TRITON® X100) of 5% referred to the polymer weight.

The coagulum was found to account for 0.025%. The viscosity measured at 35° C. was 48 cps. 4 micro-aggregates were detected during the film optical test. The cast film did not show evidence of lumps and/or cracks, but yellowish coloration was observed. Fish-eye defects were detected during the cast film deposition process.

All tests and measurements were carried out according to the procedures described above and all the data are summarized in tables 2 and 3.

COMPARATIVE EXAMPLE 4

18 liters of the dispersion from example 1 were placed in a 40 liter drum and then diluted with a solution of 600 g of GENAPOL® X80 dissolved in 22 kg of water having a conductivity of 0.4 µS/cm and following composition: Al<0.05 mg/l; Ca<0.1 mg/l; Mg<0.1 mg/l; Fe<0.05 mg/l. The resulting dispersion had a solids content of 15% referred to the weight of the dispersion and a content of nonionic surfactant of 1.5% referred to the weight of the dispersion.

The dispersion was treated with the anion exchange resin AMBERJET® 4400 in the OH⁻ form, following the procedure outlined above for 6 hours, and at the end of the treatment the ion-exchange resin was filtered off.

The ion exchange treatment was carried out at 25° C.

The content of PFOA measured according to the method described above was found to be 2.3 ppm, referred to the total weight of solids.

All conditions set for the treatments performed on the dispersion can be found in table 1.

The dispersion was concentrated via the same process described in the previous examples and the resulting dispersion had a solids content of 61.0% (w/w), a nonionic surfactant content of 2.7% referred to the polymer weight.

The concentrate dispersion was formulated with GENAPOL® X80 dissolved in water in order to obtain a dispersion having a PTFE content of 60% referred to the weight of the dispersion, and a nonionic surfactant (GENAPOL® X80) content of 5% referred to the polymer weight.

The coagulum was found to account for 0.02% of the polymer. The viscosity measured at 35° C. was 150 cps. 5 micro-aggregates were detected in the film optical test. The cast film showed manifest evidences of cracks, and was colourless. Fish-eye defects were not detected during the cast film deposition process.

All tests and measurements were carried out according to the procedures described above and all the data are reported in tables 2 and 3.

EXAMPLE 8

5 liters of the dispersion obtained as detailed in example 1 were placed in a 40 liters drum and diluted with a solution of 540 grams of TERGITOL™ TMN100X dissolved in 30 liters of water having a conductivity of 0.4 µS/cm and following composition: Al<0.05 mg/l; Ca<0.1 mg/l; Mg<0.1 mg/l; Fe<0.05 mg/l. The resulting dispersion was found to have a PTFE content of 5% (w/w), nonionic surfactant content of 1.5% wt (based on total weight of the dispersion), and a pH of 3.6.

The dispersion was treated with the cation exchange resin DOWEX® Mac3 in the H₊ form, following the procedure outlined above for 3 hours; at the end of the treatment the resin was separated by filtration.

Subsequently, the dispersion was treated with the anion exchange resin AMBERJET® 4400 in the OH form, following the procedure outlined above for 6 hours; the resin was then separated by filtration.

Above detailed sequence of treatments were repeated on the dispersion contacting the latter again with the cation exchange resin and, subsequently, with the anion exchange resin. All ion exchange treatments were carried out at 29° C.

The content of PFOA was measured as previously described. The measured value was 0.1 ppm, referred to the weight of solids.

The ionic strength of the dispersion was adjusted by addition of 200 ppm of ammonium nitrate referred to the weight of dispersion. The dispersion was loaded into a 40 liter tank and the latex was made to circulate under pressure through a semi-permeable membrane by using a centrifuge pump, in order to up-concentrate the aqueous dispersion by removing water. After 4 hours, the concentrated dispersion was recovered from the process tank. The latex had a PTFE content of 61.9% (w/w), a nonionic surfactant content of 2.8% referred to the polymer weight.

The concentrated dispersion was formulated with TERGITOL™ TMN100X dissolved in water having a conductivity of 0.4 µS/cm and following composition: Al<0.05 mg/l; Ca<0.1 mg/l; Mg<0.1 mg/l; Fe<0.05 mg/l, in order to obtain a dispersion having a PTFE content of 60% referred to the weight of the dispersion, and a nonionic surfactant content (TERGITOL™ TMN100X) of 5% referred to the polymer weight.

The presence of coagulum was undetectable.

Micro-aggregates were absent. The cast film did not show evidence of lumps and/or cracks, and was colorless. Fish-eye defects were not detected during cast film deposition process.

COMPARATIVE EXAMPLE 5

8000 liters of a PTFE dispersion, obtained by scaling up the polymerization conditions given in Example 1 on an industrial reactor, were charged in a stirred tank and stabilized with TERGITOL™ TMN100X.

The dispersion was treated with ion exchange and concentrated by ultrafiltration according to the process layout sketched in FIG. 2 except that a dilution was carried out to a final solids content of 184% wt, a non-ionic surfactant content of 1.56% (w/w), a PFOA content of 4017 ppm with respect to the total weight of solids, a pH=3.4 and was at a temperature of 22° C.

The procedure detailed in example 7 was followed, but only contacting above mentioned dispersion with anion exchange resin AMBERJET 4400 in OH⁻ form contained in two columns in series.

After up-concentration (carried out as detailed in example 7), the resulting concentrated dispersion had a PTFE content of 60.0% (w/w), a nonionic surfactant content (TERGITOL™ TMN100X) of 2.6% (w/w), a PFOA content of 3.4 ppm, referred to the weight of the solids, a conductivity of 83 μS/cm and a pH=10.59.

COMPARATIVE EXAMPLE 6

8000 liters of a PTFE dispersion, obtained by scaling up the polymerization conditions given in Example 1 on an industrial reactor, were charged in a stirred tank and stabilized with TERGITOL™ TMN100X.

The dispersion was treated with ion exchange and concentrated by ultrafiltration according to the process layout sketched in FIG. 2 except that no dilution was carried out, so that the treated dispersion had a solids content of 285% (w/w), a nonionic surfactant content of 1.69% (w/w), a PFOA content of=3549 ppm with respect to the total weight of solids, a pH=3.5 and was at a temperature of 23° C.

After up-concentration (carried out as detailed in example 7), the resulting concentrated dispersion had a PTFE content of 63.2% (w/w), a nonionic surfactant content (TERGITOL™ TMN100X) of 1.8% (w/w), a PFOA content of 4.3 ppm, referred to the weight of the solids, a conductivity of 76 μS/cm and a pH=10.59.

EXAMPLE 9

135.0 liters of the dispersion obtained in the Example 1bis were placed in a 500 liters reservoir and diluted with 67 kg of TERGITOL™ TMN100X dissolved into 220 liter of water having a conductivity of 0.4 μS/cm and composition: Al<0.05 mg/l; Ca<0.1 mg/l; Fe<0.05 mg/l.

The resulting dispersion has a PTFE content of 9.4% (w/w), nonionic surfactant content of 1.6% on the dispersion, and a pH equal to 4.1.

The diluted dispersion was treated with the cation exchange resin DOWEX® Mac3 in the H⁺ form in glass column having a diameter of 15 cm and height of 150 cm, as taught in U.S. Pat. No. 6,833,403, said column being filled with 25 liters of ion exchange resin and back washed with water. Subsequently the anion exchange treatment with resins AMBERJET® 4400 in the OH⁻ form was carried out in a similar column, filled from the top with 25 liters of ion exchange resin and back washed with water. The diluted dispersion was passed trough the columns, using a peristaltic pump, at a flow rate of 1.5 bed volume per hour resulting in a contact time of 40 min. Above treatment was repeated by passing the dispersion through cation exchange resin and anion exchange resin columns. All ion exchange treatment was carried out at 25° C.

The residual concentration of perlfuoropolyether surfactant measured according to the method described above was found to be 0.7 ppm, referred to the total weight of solids.

COMPARATIVE EXAMPLE 7

350 liters of the PTFE dispersion, obtained as described in the Example 1bis, were stabilized with 2.9% of TERGITOL™ TMN100X, referred to the weight of the dispersion.

The resulting stabilized dispersion was found to have a PTFE content of 22.1% (w/w), nonionic surfactant content of 2.8% on the dispersion, and a pH equal to 3.4.

The stabilized dispersion, at a temperature of 25° C., was submitted to the same treatment as detailed in example 9, by contacting with an anionic resin in a column. After having pumped 40 liters of dispersion, the flow of dispersion diminished 'til becoming negligible and the pump shut down due to over pressure. The column was inspected and clogging was detected. A sample of the dispersion taken from inside the column was found to have a perfluoropolyether surfactant content of 250 ppm, referred to the total weight of solids.

Table 1—Extraction Conditions

[Table 0001]

[Table]

TABLE 1

| Run | Polymer (F) | Solids content (% wt) | Non ionic surfactant type | concentration |
|---|---|---|---|---|
| Ex. 4 | from Ex. 1 | 9.5% | NS-1 | 1.5% wt |
| Ex. 5 | Mixture of latex from Ex. 1 and Ex. 2 | 9.0% | NS-1 | 1.5% wt |
| Ex. 6(*) | from Ex. 1 | 9.5% | NS-1 | 1.5% wt |
| Ex. 7 | from Ex. 1 | 85% | NS-1 | 0.6% wt |
| Ex. 8 | from Ex. 1 | 5.0% | NS-1 | 1.5% wt |
| Ex. 9 | from Ex. 1bis | 9.4% | NS-1 | 1.6% wt |
| Comp. Ex. 2 | from Ex. 1 | 22% | NS-2 | 1.5% wt |
| Comp. Ex. 3 | from Ex. 1 | 52% | NS-2 | 1.5% wt |
| Comp. Ex. 4 | from Ex. 1 | 15% | NS-3 | 1.5% wt |
| Comp. Ex. 5 | from Ex. 1 | 184% | NS-1 | 1.6% wt |
| Comp. Ex. 6 | from Ex. 1 | 285% | NS-1 | 1.7% wt |
| Comp. Ex. 7 | from Ex. 1bis | 22.1% | NS-1 | 2.8% wt |

| Run | Ion exchange conditions sequence | T | electrolyte type | amount |
|---|---|---|---|---|
| Ex. 4 | C/A/C/A | 32 | NH₄NO₃ | 200 |
| Ex. 5 | C/A/C/A | 35 | NH₄NO₃ | 400 |
| Ex. 6(*) | C/A/C/A | 30 | (NH₄)₂SO₄ | 500 |
| Ex. 7 | C/A/A | 32 | NH₄NO₃ | 230 |
| Ex. 8 | C/A/C/A | 29 | NH₄NO₃ | 200 |
| Ex. 9 | C/A/C/A | 25 | NH₄NO₃ | 400 |
| Comp. Ex. 2 | C/A/C/A | 20 | none | |
| Comp. Ex. 3 | C/A/C/A | 21 | none | |
| Comp. Ex. 4 | A | 25 | none | |
| Comp. Ex. 5 | A/A | 22 | none | |
| Comp. Ex. 6 | C/A/A | 23 | none | |
| Comp. Ex. 7 | A | 25 | none | |

(*)isopropanol is added before extraction in example 6

In table 1, NS-1 stands for TERGITOL™ TMN100X, NS-2 stands for TRITON® X100 and NS-3 stands for GENAPOL® X80.

Table 2 & 3—Purified Dispersions Characteristics
[Table 0002]
[Table]

TABLE 2

| Run | PFOA (ppm) | Viscosity at 35° C. (cps) | Coagulum on 10 μm net (% wt) | Micro-aggregates |
|---|---|---|---|---|
| Ex. 4 | 0.4 | 18 | <0.005 | none |
| Ex. 5 | 0.5 | 20 | <0.005 | none |
| Ex. 6 | 0.2 | 15 | <0.005 | none |
| Ex. 7 | 0.4 | 20 | <0.005 | none |
| Ex. 8 | 0.1 | n.d. | <0.005 | none |
| Ex. 9 | 0.7 | n.d. | <0.005 | none |
| Comp. Ex. 2 | 4.1 | 50 | 0.015 | 2 |
| Comp. Ex. 3 | 4.8 | 48 | 0.025 | 4 |
| Comp. Ex. 4 | 2.3 | 150 | 0.02 | 5 |
| Comp. Ex. 5 | 3.4 | n.d. | 0.025 | 6 |
| Comp. Ex. 6 | 4.3 | n.d. | 0.015 | 4 |
| Comp. Ex. 7 | 250(*) | n.d. | n.d. | n.d. |

In Table 2, PFOA content is expressed in ppm with respect to the total weight of solids of the dispersion; micro-aggregates stand for the defects counted in the film optical test. (*) PFOA residual content found in the dispersion when clogging of the column occurred.

[Table 0003]
[Table]

TABLE 3

| Run | Cast film appearance | Wetting (cast film) | Colour of cast film |
|---|---|---|---|
| Ex. 4 | good | good | white |
| Ex. 5 | good | good | white |
| Ex. 6 | good | good | white |
| Ex. 7 | good | good | white |
| Ex. 8 | good | good | white |
| Ex. 9 | good | good | white |
| Comp. Ex. 2 | Fish-eyes | bad | yellowish |
| Comp. Ex. 3 | Fish-eyes | bad | yellowish |
| Comp. Ex. 4 | Cracks | good | white |
| Comp. Ex. 5 | good | good | white |
| Comp. Ex. 6 | cracks | good | white |

The invention claimed is:

1. A process for purifying a fluoropolymer dispersion, said process comprising:
(i) providing an aqueous dispersion (D) of at least one fluoropolymer, polymer (F), comprising at least one fluorinated surfactant, surfactant (FS), having a solids content (SC) of 15% by weight or more;
(ii) adding to said aqueous dispersion (D) at least one non-ionic non-fluorinated surfactant, surfactant (NS), in an amount of from 1 to 20% by weight of polymer (F);
(iii) adjusting said solid content (SC) to less than 10% by weight, to obtain a diluted aqueous dispersion (dD);
(iv) contacting said diluted aqueous dispersion (dD) with at least one adsorbing material,
wherein the at least one adsorbing material removes fluorinated surfactant (FS) from the diluted aqueous dispersion (dD) so as to obtain an aqueous dispersion of polymer (F) having a content of the fluorinated surfactant (FS) of less than 1 ppm based on the total weight of solids,
wherein the at least one adsorbing material comprises beads, the surface of which have active sites that trap and release ions,
wherein polymer (F) is a homopolymer of tetrafluorethylene (TFE) or a copolymer of TFE and at least one per(halo)fluoromonomer (PFM),
wherein the PFM is selected from the group consisting of:
$C_2$-$C_8$ perfluoroolefins,
chloro- and/or bromo- and/or iodo- $C_2$-$C_6$ per(halo)fluoroolefins,
per(halo)fluoroalkylvinylethers complying with general formula $CF_2=CFOR_{f3}$, where $R_{f3}$ is a $C_1$-$C_6$ per(halo)fluoroalkyl,
per(halo)fluoro-oxyalkylvinylethers complying with general formula $CF_2=CFOX_{01}$, where $X_{01}$ is a $C_1$-$C_{12}$ per (halo)fluorooxyalkyl having one or more ether groups;
per(halo)fluoro-methoxy-alkylvinylethers complying with general formula $CF_2=CFOCF_2OR_{f4}$, where $R_{f4}$ is a $C_1$-$C_6$ (perhalo)fluoroalkyl or a $C_1$-$C_6$ per(halo)fluorooxyalkyl having one or more ether groups, and
per(halo)fluorodioxoles of formula:

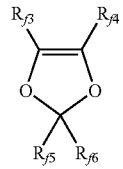

where each of $R_{f3}$, $R_{f4}$, $R_{f5}$, $R_{f6}$, equal to or different from each other, is independently a fluorine atom or a $C_1$-$C_6$ perfluoroalkyl group, optionally comprising one or more oxygen atoms.

2. The process of claim 1, wherein polymer (F) is a homopolymer of TFE or a copolymer of TFE and at least one per(halo)fluoromonomer selected from the group consisting of:
perfluoroalkylvinylethers complying with formula $CF_2=CFOR_{f7'}$, in which $R_{f7'}$ is a group chosen among $—CF_3$, $—C_2F_5$, $—C_3F_7$;
per(halo)fluorodioxoles of formula:

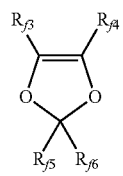

wherein $R_{f3}$ and $R_{f4}$ are fluorine atoms and $R_{f5}$ and $R_{f6}$ are perfluoromethyl groups ($—CF_3$), or wherein $R_{f3}$, $R_{f5}$ and $R_{f6}$ are fluorine atoms and $R_{f4}$ is a perfluoromethoxy group ($—OCF_3$); and
mixtures thereof.

3. The process of claim 1, wherein the aqueous dispersion (D) comprises a fluorinated surfactant, surfactant (FS), of formula:

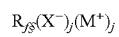

wherein $R_{fs}$ is a $C_5$-$C_{16}$ (per)fluoroalkyl chain or a (per)fluoropolyoxyalkylene chain, $X^-$ is —$COO^-$, —$PO_3^-$ or —$SO_3^-$, $M^+$ is selected from $H^+$, $NH_4^+$, an alkaline metal ion and j is 1 or 2.

4. The process of claim 3, wherein the fluorinated surfactant, surfactant (FS), is chosen from:

$CF_3(CF_2)_{n_1}COOM'$, in which $n_1$ is an integer ranging from 4 to 10; M' represents H, $NH_4$, Na, Li or K;

$T(C_3F_6O)_{n_0}(CFXO)_{m_0}CF_2COOM''$, in which T represents Cl or a perfluoroalkoxyde group of formula $C_kF_{2k+1}O$ with k is an integer from 1 to 3, one F atom being optionally substituted by a Cl atom; $n_0$ is an integer ranging from 1 to 6; $m_0$ is an integer ranging from 0 to 6; M'' represents H, $NH_4$, Na, Li or K; X represents F or $CF_3$;

F—$(CF_2$—$CF_2)_{n_2}$—$CH_2$—$CH_2$—$RO_3M'''$, in which R is P or S, M''' represents H, $NH_4$, Na, Li or K; $n_2$ is an integer ranging from 2 to 5;

A-$R_f$-B bifunctional fluorinated surfactants, in which A and B, equal to or different from each other, are —$(O)^p$CFX—$COOM^*$; $M^*$ represents H, $NH_4$, Na, Li or K; X=F or $CF_3$; p is an integer equal to 0 or 1; $R_f$ is a linear or branched perfluoroalkyl chain, or a (per)fluoropolyether chain such that the number average molecular weight of A-$R_f$-B is in the range 300 to 1,800;

and mixtures thereof.

5. The process according to claim 1, wherein the non-ionic non-fluorinated surfactant (NS) complies with formula (I) here below:

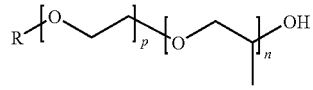
(I)

wherein R is a $C_8$-$C_{18}$ alkyl group, p and n, equal to or different from each other, are either zero or range between 6 and 18, with the provision that at least one of p and n is different from zero.

6. The process of claim 5, wherein the surfactant (NS) complies with formula here below:

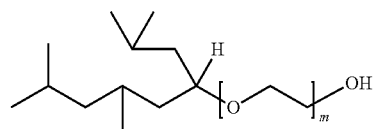

wherein m ranges between 7 and 12.

7. The process according to claim 1, wherein in step (iv) the diluted aqueous dispersion (dD) is contacted with at least one anion exchange resin and at least one cation exchange resin.

8. The process according to claim 1, wherein the size of the beads are from 0.5 to 5 mm.

* * * * *

UNITED STATES PATENT AND TRADEMARK OFFICE
CERTIFICATE OF CORRECTION

| | | |
|---|---|---|
| PATENT NO. | : 8,859,645 B2 | Page 1 of 1 |
| APPLICATION NO. | : 12/296485 | |
| DATED | : October 14, 2014 | |
| INVENTOR(S) | : Tiziana Poggio et al. | |

It is certified that error appears in the above-identified patent and that said Letters Patent is hereby corrected as shown below:

On the Title Page

Item (30)     Foreign Application Priority Data

Apr. 11, 2006  (EP) ........................................ 06112473 should read

Item (30)     Foreign Application Priority Data

Apr. 11, 2006  (EP) ........................................ 06112473.1

Signed and Sealed this
Twenty-seventh Day of January, 2015

Michelle K. Lee
*Deputy Director of the United States Patent and Trademark Office*